United States Patent [19]

Kosaka

[11] Patent Number: 4,799,304
[45] Date of Patent: Jan. 24, 1989

[54] METHOD FOR ASSEMBLING A WHEEL FOR A BICYCLE

[75] Inventor: Akihiko Kosaka, Ibaragi, Japan

[73] Assignee: Araya Industrial Co., Ltd., Osaka, Japan

[21] Appl. No.: 31,020
[22] PCT Filed: Jul. 10, 1986
[86] PCT No.: PCT/JP86/00351
 § 371 Date: Feb. 25, 1987
 § 102(e) Date: Feb. 25, 1987
[87] PCT Pub. No.: WO87/00125
 PCT Pub. Date: Jan. 15, 1987

[30] Foreign Application Priority Data

Jul. 11, 1985 [JP] Japan .................. 60-153591
Jul. 11, 1985 [JP] Japan .................. 60-153592
Jul. 19, 1985 [JP] Japan .................. 60-160968
Feb. 1, 1986 [JP] Japan .................. 61-20478
Feb. 1, 1986 [JP] Japan .................. 61-20479

[51] Int. Cl.4 ............................. B21F 39/00
[52] U.S. Cl. .................. 29/159.02; 29/159.01; 157/1.55
[58] Field of Search .......... 29/159.02, 159.01; 157/1.55; 301/55, 58, 59, 60, 105 B

[56] References Cited

U.S. PATENT DOCUMENTS 3,631,577 1/1972 Hasegawa ................ 157/1.5
3,758,931 9/1973 Patterson ................ 29/159.02
4,185,678 1/1980 Nagatomo ................ 157/1.55
4,187,895 2/1980 Saruwatari et al. ...... 157/1.55

FOREIGN PATENT DOCUMENTS 2027788 12/1970 Fed. Rep. of Germany .
2315401 1/1977 France .
48-24190 7/1973 Japan .
49-16583 4/1974 Japan .
52-27870 7/1977 Japan .
52-30747 8/1977 Japan .
53-11744 2/1978 Japan .
53-11745 2/1978 Japan .
53-11746 4/1978 Japan .
53-11747 4/1978 Japan .
56-48569 5/1981 Japan .
56-49762 11/1981 Japan .
57-12685 1/1982 Japan .
1402297 8/1975 United Kingdom .

Primary Examiner—Timothy V. Eley
Assistant Examiner—Frances Chin
Attorney, Agent, or Firm—Stevens, Davis, Miller & Mosher

[57] ABSTRACT

A method for automatically assembling a wheel for a bicycle comprising:
aligning spokes mounted on a hub;
leasing the aligned spokes to form an assembly;
transferring the assembly of hub and leased spokes to a device for loosely tightening said leased spokes;
loosely tightening the spokes of the assembly of the hub and leased spokes; and
fastening the loosely tightened spokes to complete the tightening of the loosely tightened spokes. In the aligning of the spokes the spaces between spokes are precisely retained. The leasing is carried out by a single touch operation. In transferring the assembly of hub and leased spokes to a temporary tightening device the assembled is maintained in its pretransfer position. Due to the temporarily tightening of the spokes, the final fastening may precisely tension the spokes between the hub and the rim.

6 Claims, 36 Drawing Sheets

METHOD FOR ASSEMBLING A WHEEL FOR A BICYCLE

INDUSTRIAL APPLICABILITY)

The present invention relates to a method for assembling a wheel for a bicycle.

BACKGROUND OF THE INVENTION (Prior Art and Problems Thereof)

Assembling steps for a wheel for a bicycle include:
(a) aligning step
(b) leasing step
(c) transfer step to a temporary tightening device
(d) temporary tightening step
(e) fastening step for temporarily tightened spokes In prior art, the aligning step is disclosed in
Japanese Patent Publication No. 11744/1978
Japanese Patent Publication No. 11745/1978,
the leasing step is disclosed in
Japanese Patent Publication No. 49762/1981
Japanese Patent Publication No. 11744/1978
Japanese Patent Publication No. 11745/1978,
the transfer step for transferring an assembly of a hub and spokes already subjected to leasing to the temporary tightening device is disclosed in
Japanese Patent Publication No. 11746/1978,
the temporary tightening step is disclosed in
Japanese Patent Publication No. 12685/1982
Japanese Patent Publication No. 48569/1981, and
the fastening step for temporary tightened spokes is disclosed in.
Japanese Patent Publication No. 30747/1977.
U.S. Pat. Nos. 4,185,678, 4,187,895 and the like may also be listed.

These prior arts will now be described.
(1) Aligning step
(Japanese Patent Publication No. 11744/1978)
(Japanese Patent Publication No. 11745/1978)
See attached FIGS. 7 and 8:

In conventional aligning apparatus, as shown in FIG. 7, a temporary assembly (hereinafter referred to as a temporary assembly D) of a hub H and spokes prior to leasing is rotated at a rotational speed to an extent that a predetermined centrifugal force acts on the spokes to thereby radially align the spokes whereas an annular retaining body E provided concentrically with the temporary assembly D is rotated at the same speed as and in the same direction as that of the temporary assembly D to retain the aligned spokes in their attitude by means of a retaining portion of the retaining body E provided at a position coincided with a tip of the spoke.

As shown in FIG. 8, in the upper edge of the retaining body E are provided in a predetermined order a first notch 51 for retaining a first spoke 21 positioned on the upper surface side of one spoke mounting plate 11 of the hub, a second notch 52 for retaining a second spoke 22 positioned on the lower surface side, and a third notch 53 for retaining a third spoke 23 positioned on the upper surface side of the other spoke mounting plate 12 and a fourth notch 54 for retaining a fourth spoke 24 positioned on the lower surface side. Thus, when the upper end edge of the retaining body E is raised toward the spokes while rotating the retaining body E in the same direction as and at the same speed as the rotation of the hub when the respective spokes have been radially aligned by the rotation of the temporary assembly D, the spokes are fitted into the corresponding notches whereby the spokes of the temporary assembly D are held radially aligned.

However, in prior art arrangement, when the hub H of the temporary assembly D is rotated while maintaining it in the upright attitude, the relationship between the retaining body E and the hub has to be preset properly. More specifically, this involves an inconvenience that the temporary assembly D has to be set so that the first spoke mounting part in the spoke mounting plates and the first notch 51 of the retaining body E are radially opposed to each other.

This results from the fact that the respective spokes are to be retained by the notches formed in the upper end edge of the retaining body E while rotating the retaining body E and the hub H in the same direction and at the same speed.

(2) Leasing step (laced crossing step)
(Japanese Patent Publication No. 49762/1977,
Japanese Patent Publication No. 11744/1978,
U.S. Pat. No. 4,187,895, and
U.S. Pat. No. 4,185,678)
See attached FIGS. 10, 11, 12 and 13:

Spokes to be mounted on the hub H are divided into four kinds of spokes as noted below in terms of the relationship between a pair of first and second spoke mounting plates 11, 12 provided on the hub. (See FIGS. 10 and 11.)

First spoke extending from the outer surface side of the first spoke mounting plate 11 toward the rim R . . . 21.

Second spoke extending from the inner surface side of the first spoke mounting plate 11 toward the rim R . . . 22.

Third spoke extending from the inner surface side of the second spoke mounting plate 12 toward the rim R . . . 23.

Fourth spoke extending from the outer surface side of the second spoke mounting plate 12 toward the rim R . . . 24.

Among these four spokes, the first and second spokes 21 and 22 are extended in a crossed state from each other, and the third and fourth spokes 23 and 24 are mutually adjusted in a crossed state.

The method for mutually crossing a set of spokes (leasing method) as described above has already been proposed in Japanese Patent Publication No. 49762/1981. This conventional method is employed as a method for leasing spokes of a wheel for a motor cycle, inw hich in accordance with the method disclosed in Japanese Patent Publication No. 11744/1978, a temporary assembly D having spokes radially aligned from the hub H is provided, the tips of spokes in the temporary assembly D are separately supported by the respective supporting annuli at every group of the aforesaid four groups of the spokes, and each supporting annulus is individually turned in a predetermined direction, as shown in FIG. 5.

According to this conventional method, first, the first spokes 21, 21 are supported by the respective supporting portion 36 of the first supporting annulus 31 disposed concentrically with the temporary assembly D, the second spokes 22, are supported by supporting portion 36 of the second supporting annulus 32 positioned continuous to and downwardly of the first supporting annulus 31, the third spokes 23 are supported by supporting portion 36 of the third supporting annulus 33 and the fourth spokes 24 are supported by suppouting portion 36 of the fourth supporting annulus 34, as shown in FIG. 12.

Subsequently, when the first and fourth supporting annuli 31 and 34 are normally rotated through a fixed angle and the second and third supporting annuli 32 and 33 are reversely rotated through a fixed angle, the first spoke 21 and the second spoke 22, and the third spoke 23 and fourth spoke 24 are crossed as shown in FIG. 13.

With this arrangement, leasing is carried out so that the first spoke 21 is positioned externally of the second spoke 22 and the fourth spoke 24 is positioned externally of the third spoke 23, which leasing cannot be used to effect leasing of a wheel for a bicycle without modification.

Because in the wheel for a bicycle, in the crossed portion between the first and second spokes 21 and 22, the first spoke 21 is positioned internally of the second spoke 22, and in the crossed portion between the third and fourth spokes 23 and 24, the fourth spoke 24 is positioned internally of the third spoke 23.

(3) Transfer step to a temporary tightening device
(Japanese Patent Publication No. 11746/1978)
(U.S. Pat. No. 4,187,895)

See attached FIGS. 17, 18 and 19:

Assembling of the wheel comprises an aligning step for radially aligning spokes inserted into the hub H, a leasing step for crossing the spokes from the previous state, a temporary assembling step for inserting an assembly of the hub H and the spokes already subjected to leasing (hereinafter referred to as an assembly K) to screw the respective spokes to the rim, and a final fastening step for finally fastening spoke nipples of the wheel in the aforesaid temporarily assembled state.

In this assembling step for the wheel, the assembly K needs to be transferred when the step is shifted from the leasing step to the temporary assembling step. In prior art, the transfer apparatus (Japanese Patent Publication No. 11746/1978) as shown in FIGS. 17 to 19 has been employed.

This conventional apparatus comprises a locating means 2A for retaining the foremost ends of spokes in the leasing state in correspondence to the spoke arrangement of the assembly K, a hub clamping means 3A for clamping the hub H, a lift means 4A for integrally raising both said means, and a travelling means 5A for horizontally moving said whole body along rails 563.

The above-described means are utilized to transfer the assembly K of the wheel provided with a large hub such as a motor cycle. The hub H is clamped by the hub clamping means 3A, a locating element 223 of a stationary frame 213 constituting the locating means 2A and an engaging element 243 of a rotatable frame 233 are operated as shown in FIGS. 18 and 19 to locate the respective spokes, the whole body is raised by the lift means 4A, and thereafter it is transferred by the travelling means 5A to a predetermined position.

With this arrangement, both the hub H and the foremost ends of spokes are clamped during the transfer of the assembly K, and the load of the assembly K is mainly borne by the hub clamping means 3A. Therefore, the assembly K is never disengaged from the transfer apparatus during the transfer. However, it is difficult to employ this arrangement for the transfer of the assembly K of the wheel for a bicycle without modification.

This results from the fact that the hub for a bicycle is extremely small in diameter as compared with that of a motorcycle to make it difficult to correspond clamping pawls 313, 313 of the hub clamping means 3A to the hub H, and if an attempt is made to support the load of the assembly K by these clamping pawls, the safety of the transferring attitude of the assembly is impaired.

(4) Temporary tightening step
(Japanese Patent Publication No. 12685/1982,
Japanese Patent Publication No. 48569/1981)

See attached FIG. 23: In order to incorporate the rim with the assembly K wherein the hub H and spokes S are temporarily assembled into the leasing state onto the rim R, it is necessary to insert the foremost end of the spoke into a spoke hole 14 of the rim R and bring a nipple N into threaded engagement with a threaded portion 39 at the foremost end of the spoke S.

To this end, in the past, the threaded portion 39 of the spoke S has been inserted through the spoke hole 14 of the rim R by means of a spoke guide means disclosed in Japanese Patent Publication No. 12685/1982, after which the nipple is tightened by a tightening means disclosed in Japanese Utility Model Publication No. 48569/1981. (FIG. 23)

However, in case of the above-described prior method, at the time when the spoke S is inserted into the spoke hole 14, the inner circumferential surface of the rim R is liable to be scratched, which injures a valuable product.

This results from the above-described spoke guide. The spoke S of the assembly K is first deformed as shown in FIG. 23, and the threaded portion 39 is registered with the spoke hole 14 by means of a guide member, after which the curved state is released and the foremost end of the spoke S is inserted into the spoke hole 14.

In this case, if the spoke hole 14 is slightly deviated from the threaded portion 39, the foremost end of the threaded portion 39 abuts against the peripheral edge of the spoke hole 14 and is then inserted into the spoke hole 14, at which time, a scratch occurs.

(5) Fastening step for temporarily tightened spokes
(Japanese Patent Publication No. 30747/1977)

See attached FIG. 42:

The representative apparatus of this kind is a fastening machine for a spoke nipple of a wheel, as disclosed in Japanese Patent Publication No. 30747/1977.

According to this application, a wheel with spokes of the assembly K temporarily tightened (hereinafter referred to as a wheel W) is attached to an intermittently rotating table A, driver devices 9 are radially arranged from the center of rotation of the table in the outer circumference of the table, each driver device being disposed movably forward and backward along the radial line, and rotating and stopping timing of the intermittently rotating table A, forward and backward operating timing of the driver devices 9, and fastening operating timing of the driver devices 9 are set to a predetermined timing. (See FIG. 42)

In this case, when this apparatus is actuated after the wheel W in the temporarily assembled state has been set on the table A, nipples for spokes arranged in the outer circumferential surface of the rim are successfully fastened.

However, in this conventional arrangement, when an error in the nipple arranging pitch of the nipples is present, a fastening error is liable to result from the driver device 9.

The driver devices are positioned independently of the wheel W, and tools 92 of the driver devices are moved advanced toward the nipples and fastened when the table A stops. Therefore, when the error in the stop position of the table A and the error in the arranging pitch of the nipples are combined, the tool portions are not correctly opposed to the nipples when the driver devices are advanced, bringing forth the inferior fastening.

SUMMARY OF THE INVENTION (a) Aligning step

In an arrangement wherein the hub is rotated to align radially the spokes mounted on the hub and each of spokes are retained to maintain the said aligned state by means of retaining bodies provided concentrically with the hub, the present invention has its technical task in that the spokes mounted on the hub could be retained in the aligned state without rotating the retaining bodies in the same direction as and at the same speed as that of the hub, for overcoming the inconveniences to preset the relative location properly between the hub and the retaining bodies.

According to the technical means employed to solve the aforesaid technical task, a pair of retaining bodies are opposed to each other from above and below the hub, the retaining bodies being paired to be rotatable with respect to the hub, each of the retaining bodies being composed of a group of convergent pins as spacing-holding means which is just fitted between the adjacent spokes in the aligned state, these groups of pins being positioned externally in the neighborhood of the spoke mounting plate of the hub, the groups of pins being pushed out so as to be protruded between the spokes when the spokes mounted on the hub are being rotating or stopped.

The aforesaid technical means of the present invention operates as follows:

When the spokes mounted on the hub are rotated, the first to fourth spokes are radially aligned about the hub when the rotational speed reaches a fixed value.

At that time, the retaining bodies are paired rotatable with respect to the hub and the foremost end of the spacing-holding means is convergent. Therefore, when the retaining bodies are pushed into and toward the spokes in the aligned state, the spacing-holding means of one retaining means and that of the other retaining body are slipped between the first and second spokes and between the third and fourth spokes, respectively.

Since these spacing-holding means are set in diameter to a predetermined value while being adjusted to the spacing between the spokes in the aligned state, the spokes are maintained aligned by the insertion of the spacing-holding means.

(b) Leasing step

In an arrangement wherein a first, second, third and fourth supporting annuli for individually supporting first, second, third and fourth spokes radially aligned by respective supporting portions are relatively rotated to effect leasing of the spokes, the present invention has its technical task in that in order to effect the leasing of spokes for a wheel for a bicycle in their extended or stretched state, the relative position between the spokes may be reversed in the preceding stage where the spokes are crossed each other.

According to the technical means of the present invention, the first, second, third and fourth supporting annuli are relatively rotated and the rotation thereof is stopped at the time each of the spokes is positioned in the state immediately before the crossing of the spokes; thereafter the spokes are held in the aforesaid state prior to the crossing and the first, second, third and fourth supporting annuli are withdrawn as a whole; under this withdrawn state, the supporting portion of the first supporting annulus is opposed to the second spoke in the state before the crossing, the supporting portion of the second supporting annulus opposed to the first spoke before the crossing whereas the supporting portion of the third supporting annulus opposed to the fourth spoke in the state similar to above and the supporting portion of the fourth supporting annulus opposed to the third spoke in the state similar to above; thereafter, the supporting portions are opposed to and made close to the spokes to support the spokes on the supporting portions after which the spoke holding state is released; and the first, second, third and fourth supporting annuli are relatively rotated through a fixed angle so that the first and second, and the third and fourth spokes are relatively rotated through a fixed angle.

The technical means according to the present invention operates as follows:

The radially extended aligned spokes mounted on the hub are set so that the spokes may assume the state immediately before the crossing by the first relative rotation of the supporting annuli. In this state, the positional relation between the spokes in the axial direction of the wheel remains unchanged.

Next, when the supporting annuli are set to a new relative position, the supporting state of the first spoke and the second spoke is reversed to the supporting state of the third spoke and the fourth spoke, and the spokes are subjected to leasing by the relative rotation of the supporting annuli. Under this leasing state, the first spoke is positioned internally of the second spoke and the fourth spoke is positioned internally of the third spoke, thus assuming the leasing state as desired.

(c) Transfer step to a temporary tightening device

In a device for transferring an assembly of the hub and spokes already subjected to leasing under the hanging state in the leasing attitude, the device being provided with an assembly holding device which is raised by a lift means provided on a travelling device, the present invention has its technical task in that in order that even an assembly of the hub and spokes already subjected to leasing which hub is small and spokes are long may be transported in the stabilized manner, the assembly may be raised while holding only the spokes.

The technical means according to the present invention comprises an elevating shaft which raises the assembly holding device of the hub and spokes already subjected to leasing by means of a lift device and which has a lower end fitted in the shaft of the hub, a retaining frame advanced-paired with respect to the elevating shaft, two kinds of multiple tongues protruded on the peripheral edge of the retaining frame so as to oppose to the spokes and being provided with a downwardly opened opening which slips over the spoke, a hook provided on one tongue so as to close the opening, and a hook actuating device adapted to open and close the hook at a predetermined timing. The tongue is made to correspond to the first spoke positioned under the hub and the other tongue is made to correspond to the second spoke positioned above the hub, whereby the operating timings of various portions so that the retaining frame is moved down after or simultaneously with downward movement of the elevating shaft and the hook causes the opening to be closed after the retaining frame has been moved down.

The aforesaid technical means of the present invention operates as follows:

When the elevating shaft is moved down, the foremost end thereof is fitted in the shaft of the hub, after which the retaining frame is moved down and the multiple of tongues in the peripheral edge thereof are fitted at the spokes and openings. Accordingly, in this state, the spokes are held in the leasing attitude.

Then, the hook causes the opening of the tongue to be closed according to the operation of the hook actuating device, whereby the first spoke is surrounded by the upper end of the opening and the hook and the first spoke is held in its locked state.

Thereafter, when the retaining frame and the elevating shaft are raised by the lift device, the oscillation of the hub in the axial direction caused by the first and second spokes is being slightly restricted and therefore, the assembly of the hub and spokes already subjected to leasing is suspended with hook through the first spoke though a little deviation in fitting between the hub shaft and the elevating shaft might occur, and after all the assembly is retained by the retaining frame and raised.

Thereafter, the assembly of the hub and spokes already subjected to leasing is transferred to the predetermined position by the travelling device. When the hook is opened after the retaining frame has been moved down and the retaining frame and the elevating shaft are again moved upward, the assembly of the hub and spokes already subjected to leasing is separated therefrom.

(d) Temporary tightening step

In a method for once curving spokes and thereafter inserting the spokes into spoke holes of the rim, the present invention has its technical task in that for preventing occurrence of scratches resulting from the insertion of the spokes, the rim and spokes may be connected in the state where the spokes are not inserted.

According to the technical means of the present invention, the spoke is curved, and the threaded portion at the foremost end thereof is positioned in the neighbourhood inside the spoke hole, under which condition the nipple is threadedly engaged from the outside of the rim.

The technical means according to the present invention operates as follows:

In the state where the inner peripheral surface of the rim is not in contact with the foremost end of the spoke, the nipple is threadedly engaged from the outside of the rim. Accordingly, as long as the nipple and the threaded portion of the spoke are threadedly engaged, the spoke and the rim are positively connected through the nipple. Also, in this state, the foremost end of the spoke is not exposed to the outside.

When the spoke is uncurved simultaneously with or after the tightening of the nipple, the foremost end of the spoke is positively connected to the rim.

(e) Fastening step for temporarily tightened spokes

In an arrangement wherein a temporarily tightened wheel having a multiple of nipples disposed into a temporarily tightened form at a predetermined pitch in a one direction is intermittently moved in the arranged direction of the nipples, and when the wheel is stopped, the nipples are fastened by the driver devices, the present invention has its technical task in that for avoiding an error in fastening of the threaded elements, the relative position between the tool portions of the driver devices and the nipples is locked by members provided on the driver devices during the fastening operation by the driver devices.

According to the technical means of the present invention, the driver devices are provided in the neighborhood of the moving locus of the temporarily tightened wheel so that the drivers may be moved forward and backward in a direction at right angles to the moving locus, a stopper is provided at the foremost end of the driver device, the stopper being constantly spaced apart from the tool, the spacing being adjusted to the head of the threaded element, at least the foremost end of the driver device is made movable from its initial position to and within a fixed range in the moving direction of the rim and is always urged toward the initial position, and when the driver device is moved forward to abut the stopper against the head of the nipple and to have the stopper moved from the initial position to and within a fixed range, the tool may come into engagement with the head of the nipple.

The aforesaid technical means operates as follows:

In the step for the intermittent movement of the rim, in the neighbourhood of the final position of the intermittent movement, the driver device is in the advancing state and the stopper and the head of the nipple abut. When they have moved through the fixed range under their abutting state, the tool of the driver device faces to and engages the head of the nipple. Since at the time of the engagement, the stopper is urged in its returning direction, the nipple positively abuts against the stopper against the urging force thereof, and the relative position between the stopper and the head of the nipple is constant. On the other hand, since the spacing between the stopper and the tool is restricted to be constant while being adjusted to the head, the tool positively registers with the head of the nipple.

(f) Step for inserting nipples into spoke holes prior to the temporary tightening step In an arrangement wherein nipples are continuously inserted by the inserting device into spoke holes arranged in the rim at a fixed pitch and in which the rim is intermittently moved in the arranging direction of spoke holes and when the rim stops, the inserting device is actuated to feed the nipples toward the holes, the present invention has its technical task in that the tool is opposed to the hole through a locating device which engages the hole to effect reciprocating movement.

According to the technical means of the present invention, there is composed of an inserting device provided movably parallel to the rim, an auxiliary moving body which engages spoke holes provided closely by the rim R is moved from its initial position to the final position, and afterwards is separated from the rim to be returned to the initial position, the initial position of the inserting device being set at a position deviated from the final position of the auxiliary moving body, urging means for returning the inserting device to the initial position, pressing means for bringing a part of the inserting device into abutment against the auxiliary moving body at least in the final position of the auxiliary moving body, the abutting relation between the inserting device and the auxiliary moving body being set so that the tool at the foremost end of the inserting device may be opposed to the spoke hole, in the final position of the auxiliary moving body and locking means for locking the inserting device for a fixed period of time after the aforesaid abutment, said locking means being provided on the inserting device.

The aforesaid technical means operates as follows:

The rim is intermittently moved by means of a suitable feeder, and one stroke of this movement approximately coincides with the arranging pitch of the spoke holes. In one stroke of the movement, the auxiliary moving body engages the spoke hole of the rim and is moved from the initial position to the final position, and the moving body is temporarily stopped at the final position. Thereafter the inserting device is moved in parallel along the rim by the pressing means and abuts against the auxiliary moving body in the stopped state. In this abutting state, the tool at the end of the inserting device and the spoke hole are placed in the exactly registered state, after which the inserting device is locked at a corrected position by the locking means.

Then, the auxiliary moving body is independently returned to its initial position, and the inserting device is actuated so that the nipple is inserted into the spoke hole.

Thereafter, various stations are in their initial state, and the rim is ready for the succeeding step.

The effects of the present invention may be summarized as follows:

(a) Aligning step

The spacing-holding means of the retaining body slips between the aligned spokes to hold the spokes in the aligned state. Therefore, the spokes may be held in the aligned state irrespectie of the relationship between the retaining body and the hub. Accordingly, this overcomes the inconvenience in that the hub and spokes are positioned with respect to the retaining body.

In addition, since the retaining body need not be rotated and driven, the driving device may be simplified.

Moreover, the retaining body may be miniaturized since it is composed of the group of spacing-holding means disposed in the neighbourhood of the spoke mounting plate of the hub.

(b) Leasing step

The leasing may be carried out so that the first spoke is positioned internally of the second spoke and the fourth spoke is positioned internally of the third spoke, and the leasing of the spokes is completed at a stroke. Therefore, the leasing operation for the spokes for a wheel for a bicycle may be efficiently carried out.

(c) Transfer step to a temporary tightening device

The hub is not retained and yet the spokes are retained. Therefore, if the hub would be small, the assembly may be transported.

Moreover, the structure for holding the spokes is simple as compared with prior art which holds all the spokes. More specifically, the hooks may be decreased to ½ or ¼ of the quantity of conventional locking pieces.

(d) Temporary tightening step

When the rim spokes are connected, the foremost end of the spoke never comes into direct contact with the peripheral portion of the spoke hole, and no scratch is given to the inner peripheral surface of the rim as encountered in prior art.

Furthermore, since the nipple is threadedly slipped over the threaded portion in the step prior to insertion thereof into the spoke hole, no inconvenience occurs such that the threaded portion is damaged by the contact with the peripheral wall of the spoke hole.

(e) Fastening step for temporarily tightened spokes

When fastening the nipple, the head of the nipple and the tool are exactly registered without being affected by the error in the arranging pitch of the nipples and without being affected by the error in the intermittently moving pitch of the temporarily tightened wheel. Therefore, the inferior fastening resulting from the deviation in engagement between the tool and the aforesaid head is hard to occur.

(f) Step for inserting nipples into spoke holes prior to the temporary tightening step The inserting device is locked in the state where the inserting device is made in registration with the final position of the auxiliary moving body which moves in registration with the spoke holes of the rim, and in this state the tool is opposed to the spoke hole. Therefore, even if there is unevenness in the arranging pitch of the spoke holes, the tool of the inserting device properly faces to the spoke hole and as the result an error in insertion of the nipple hardly occurs.

BRIEF DESCRIPTION OF THE DRAWINGS (Aligning and leasing steps)

(Transfer step)

Figure 16:
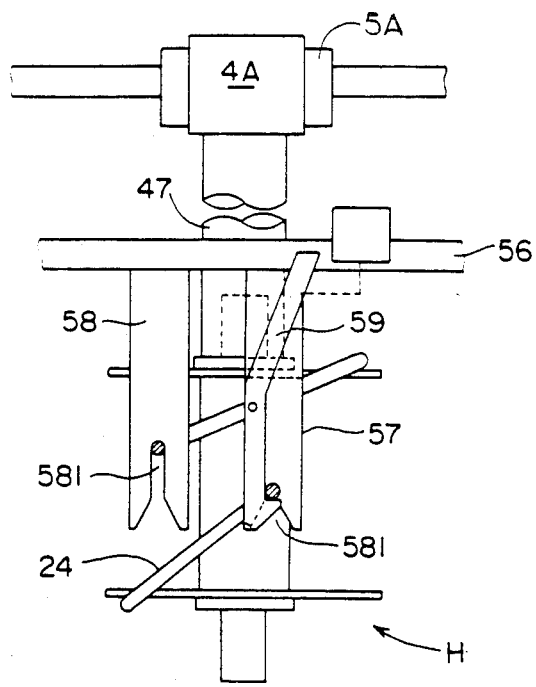
Figure 18:
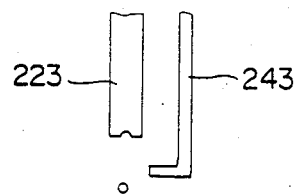
Figure 19:
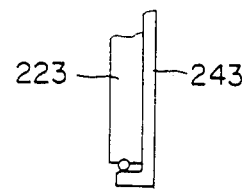
Figure 17:
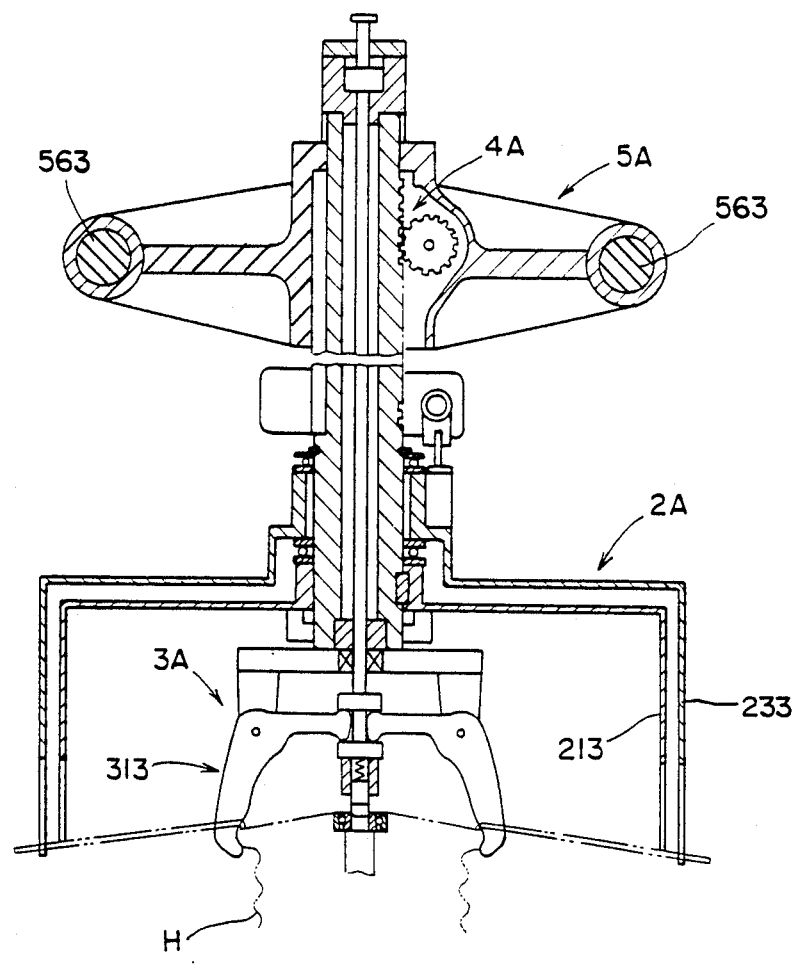
Figure 20:
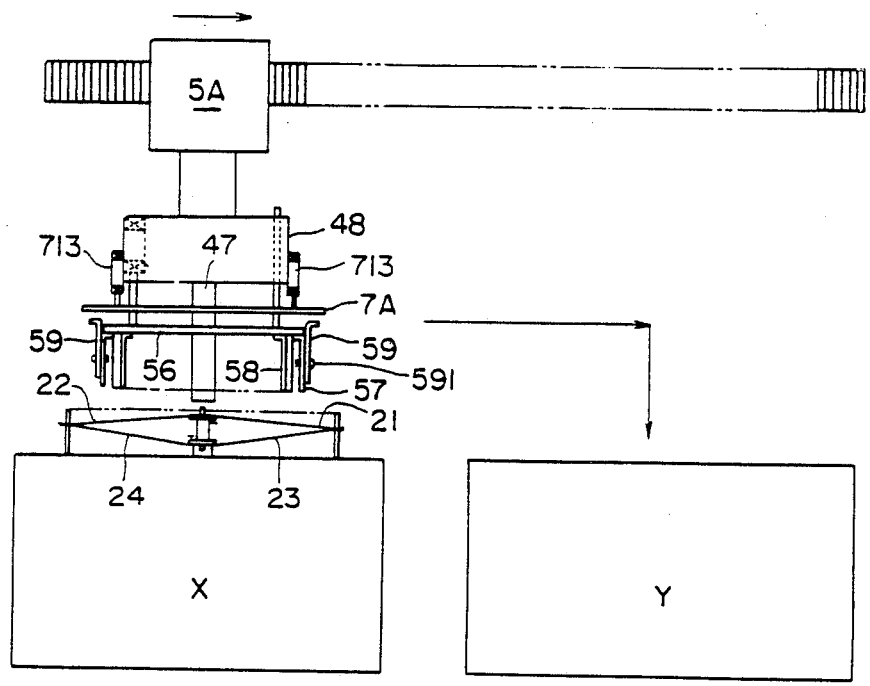
Figure 21:
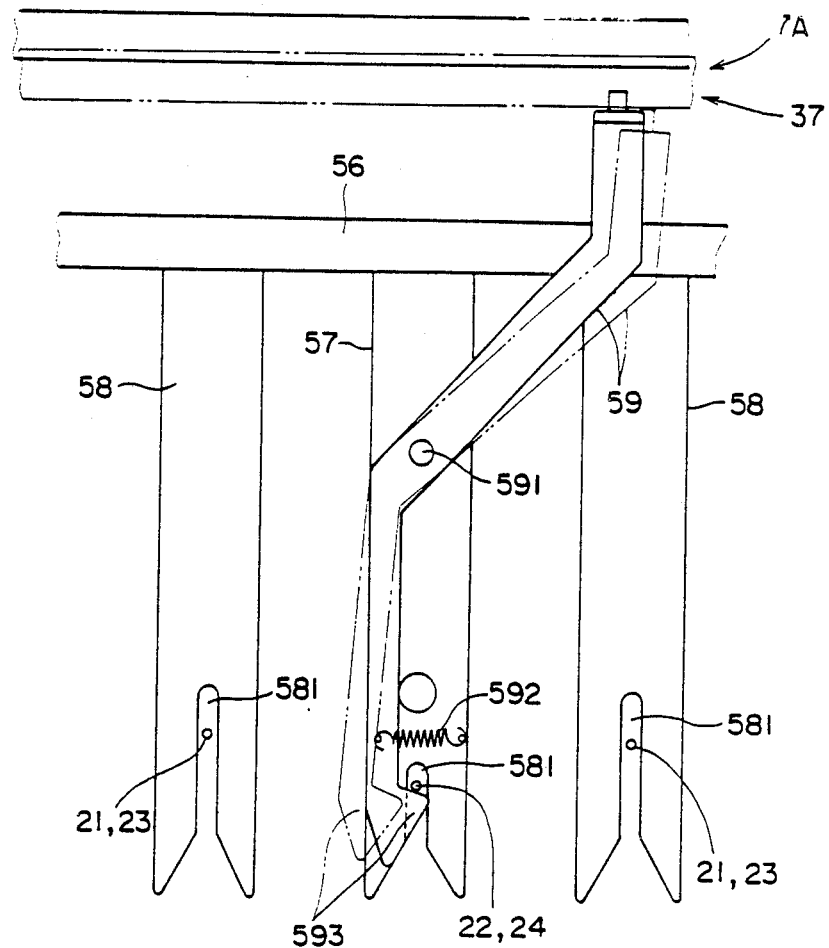

FIG. 16 illustrates the skeleton type transfer device;

FIGS. 17 through 19 (prior art) illustrate a conventional transfer device;

FIG. 20 illustrates an embodiment of the transfer device;

FIG. 21 illustrates essential parts of the transfer device;

(Temporary tightening step)

Figure 22:
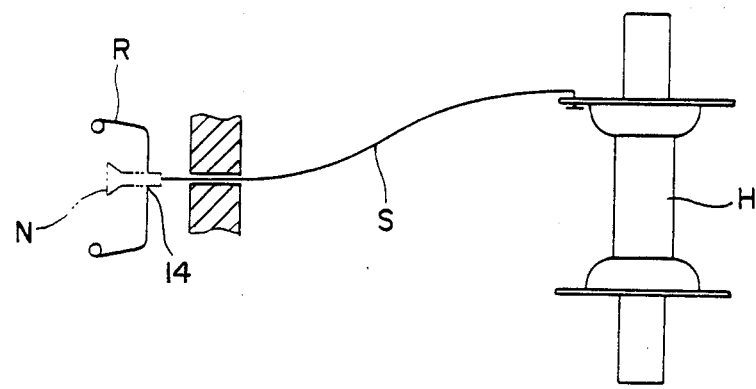
Figure 23:
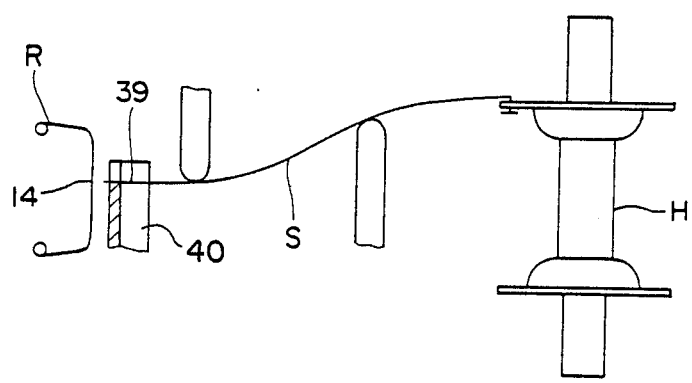
Figure 24:
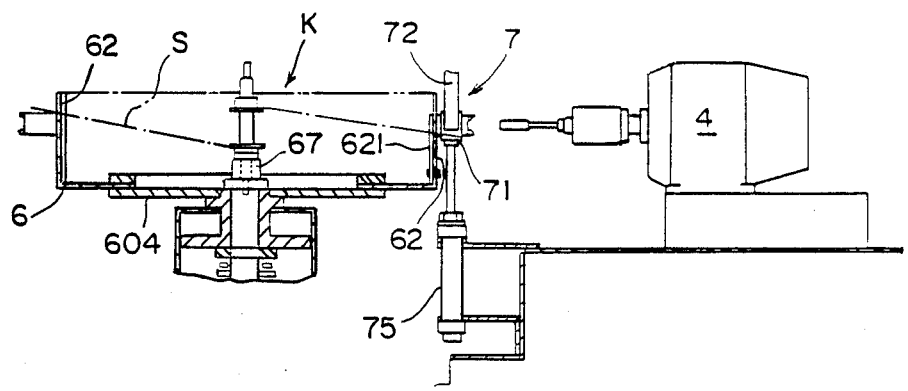
Figure 25:
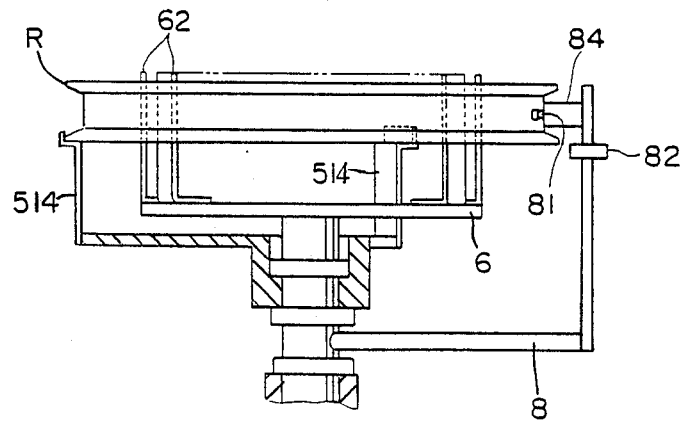
Figure 26:
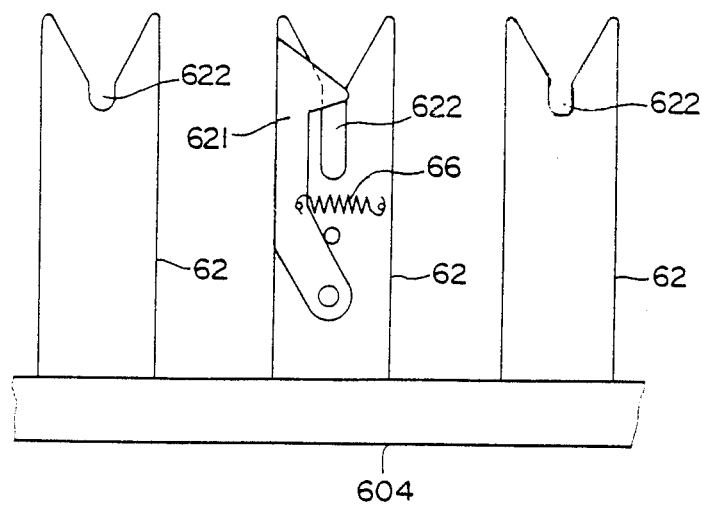
Figure 27:
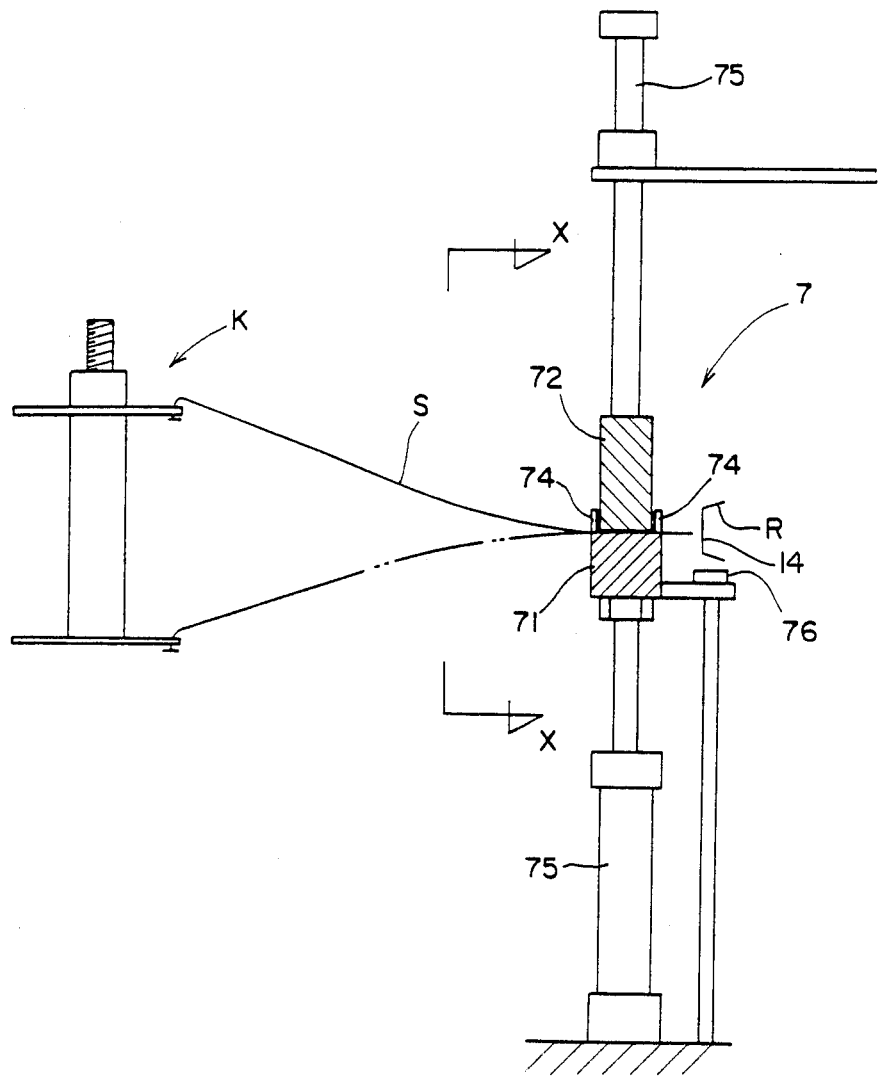
Figure 28:
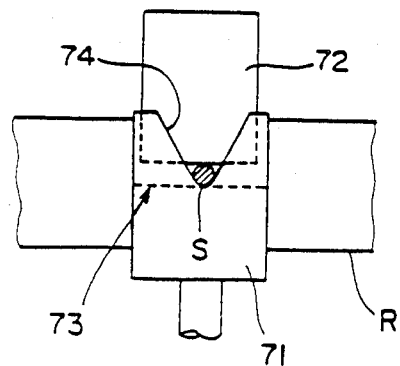
Figure 29:
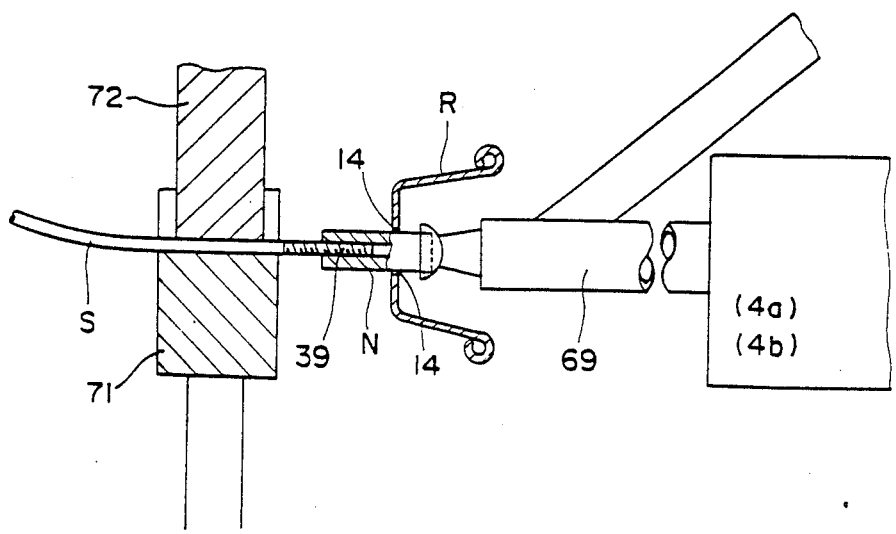

FIG. 22 illustrates the principle of the temporary tightening device;

FIG. 23 (prior art) illustrates a conventional temporary tightening device;

FIG. 24 illustrates essential parts of the temporary tightening device;

FIG. 25 illustrates a rim retaining device;

FIG. 26 shows the details of essential parts of a locking or securing frame;

FIG. 27 illustrates a clamping device;

FIG. 28 is a sectional view taken along X—X;

FIG. 29 illustrates when the nipple is threadedly engaged;

(Fastening step)

Figure 30:
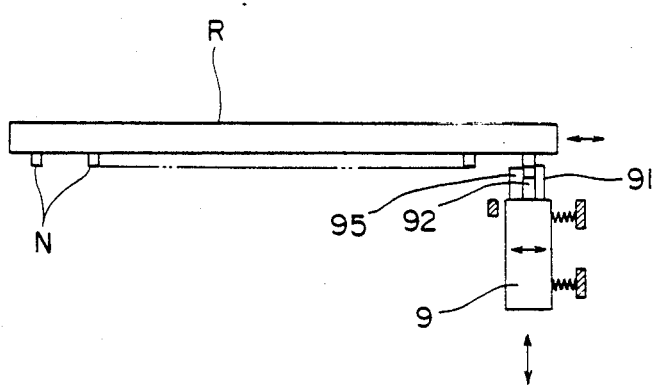
Figure 34:
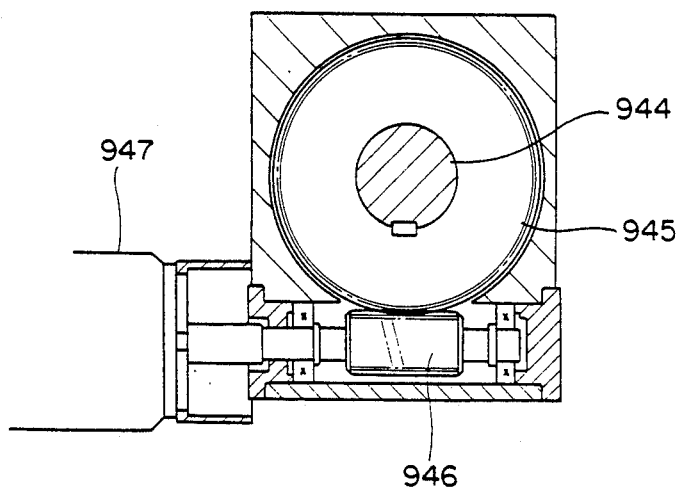
Figure 31:
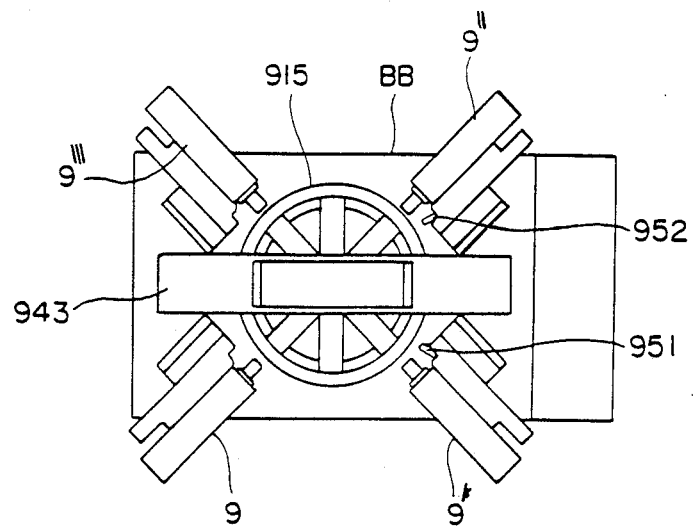
Figure 32:
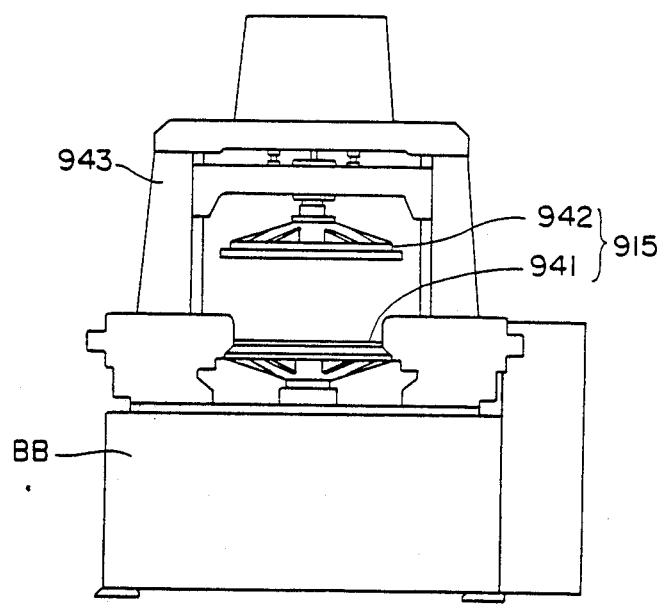
Figure 33:
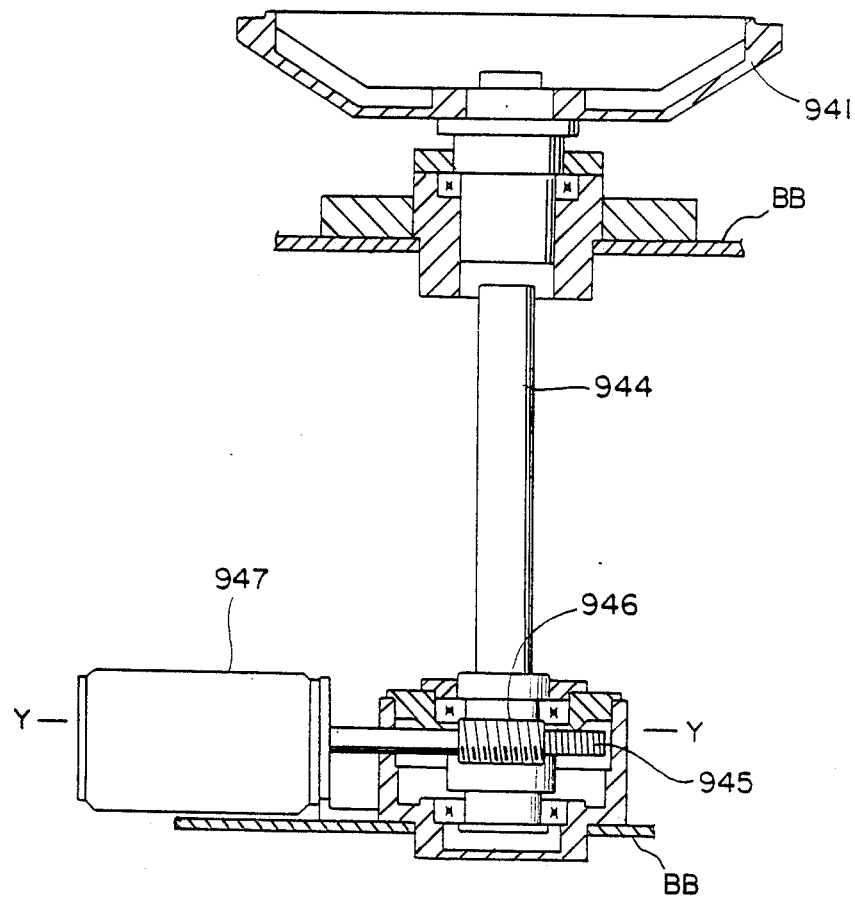
Figure 35:
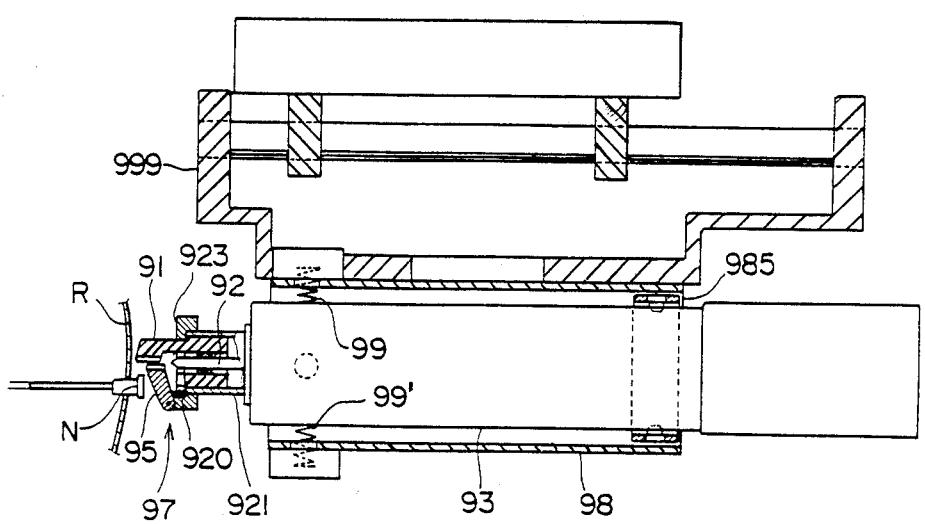
Figure 36:
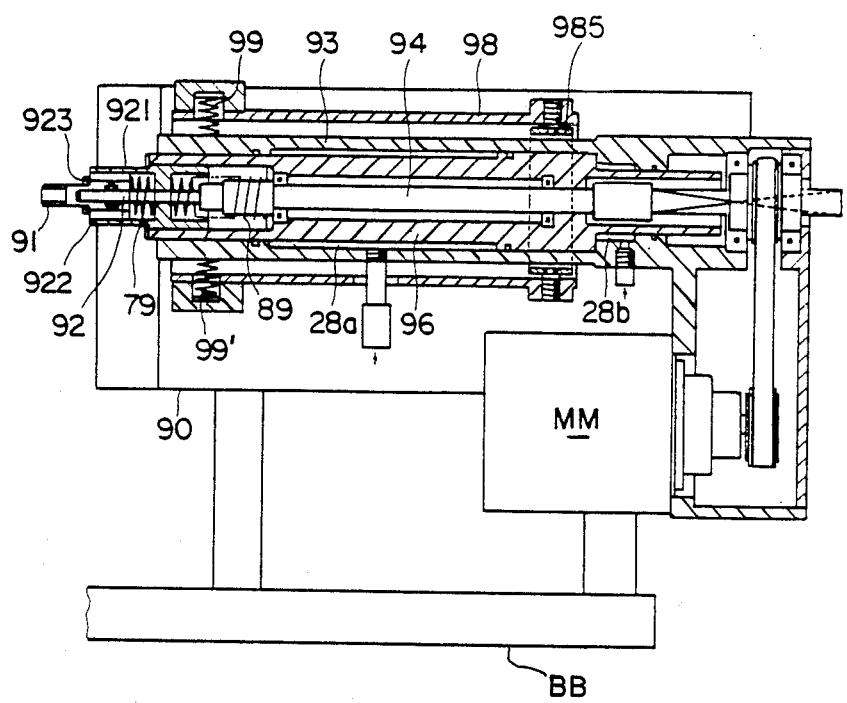
Figure 37:
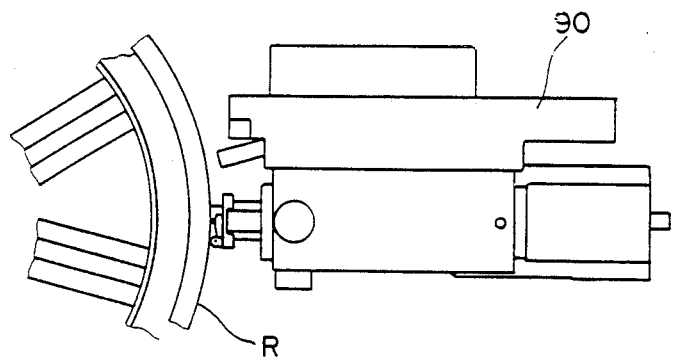
Figure 38:
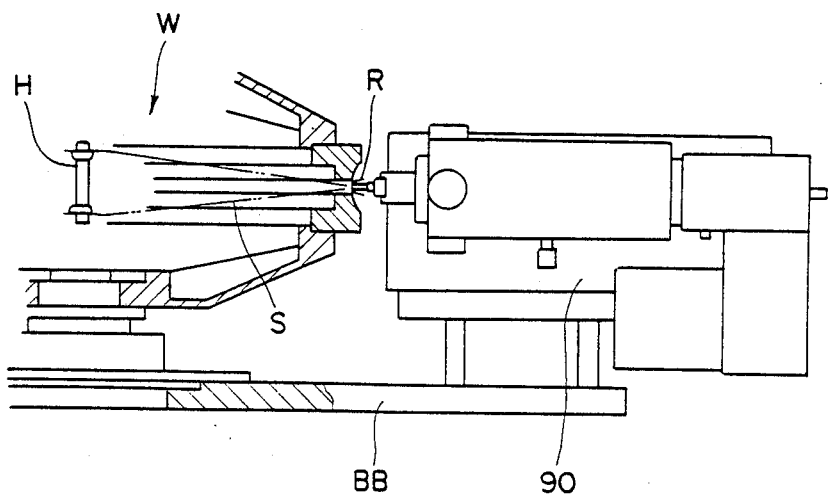
Figure 39:
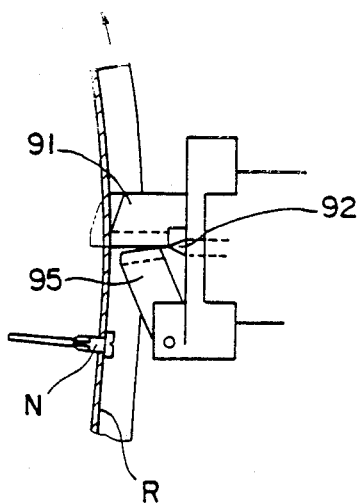
Figure 40:
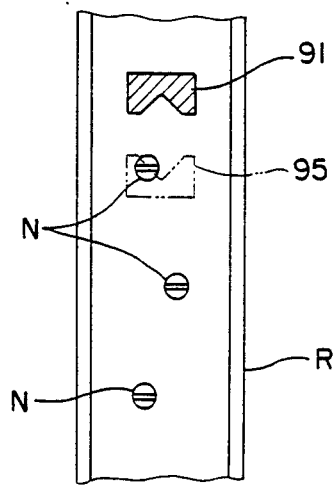
Figure 41:
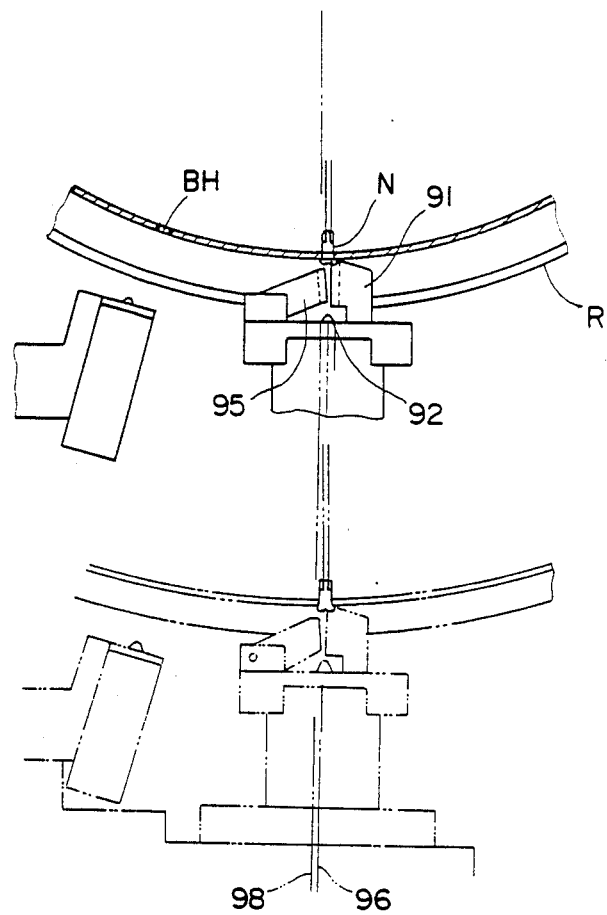
Figure 42:
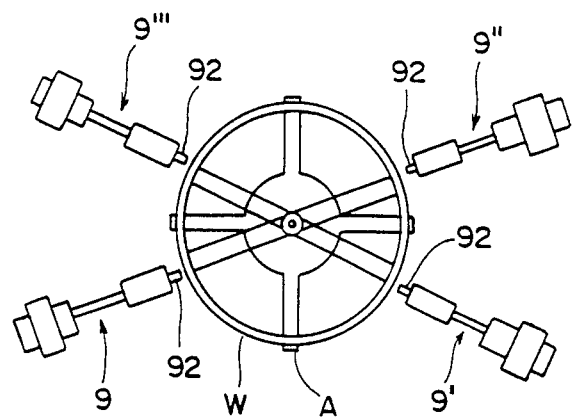

FIG. 30 illustrates the skeleton type fastening device;
FIG. 31 is an overall plan view of a fastening machine for carrying out the fastening step;
FIG. 32 is a front view thereof;
FIG. 33 is a sectional view of a wheel clamp-drive device;
FIG. 34 is a sectional view taken along Y—Y of FIG. 33;
FIG. 35 is a plan view of a driver device;
FIG. 36 is a sectional view of the driver device;
FIGS. 37 and 38 illustrate the relationship between the driver device and the wheel;
FIGS. 39 and 40 are details of the relationship between the rim and the nipple clamp;
FIG. 41 illustrates the relationship among the second sensor, and the driver device and rim;
FIG. 42 illustrates a conventional example of the fastening device.

(Nipple inserting step)

Figure 43:
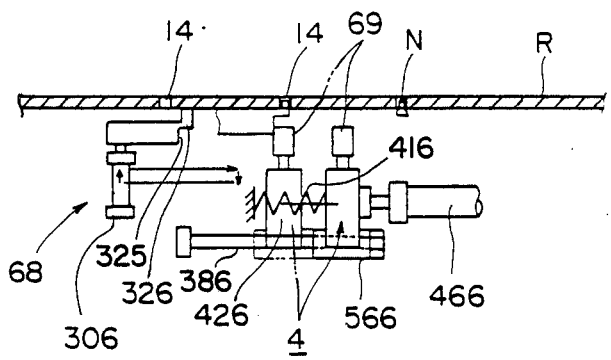
Figure 44:
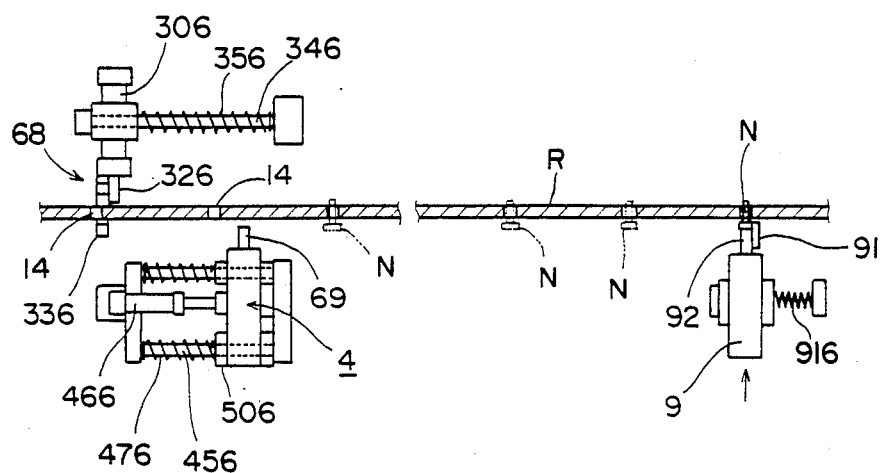
Figure 46:
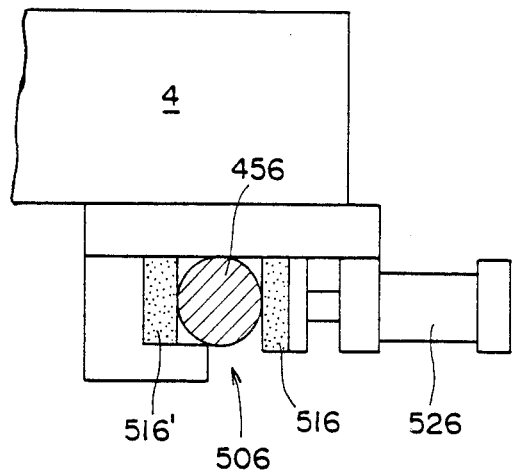
Figure 45:
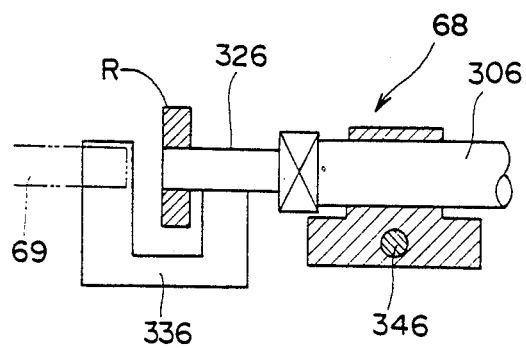
Figure 47:
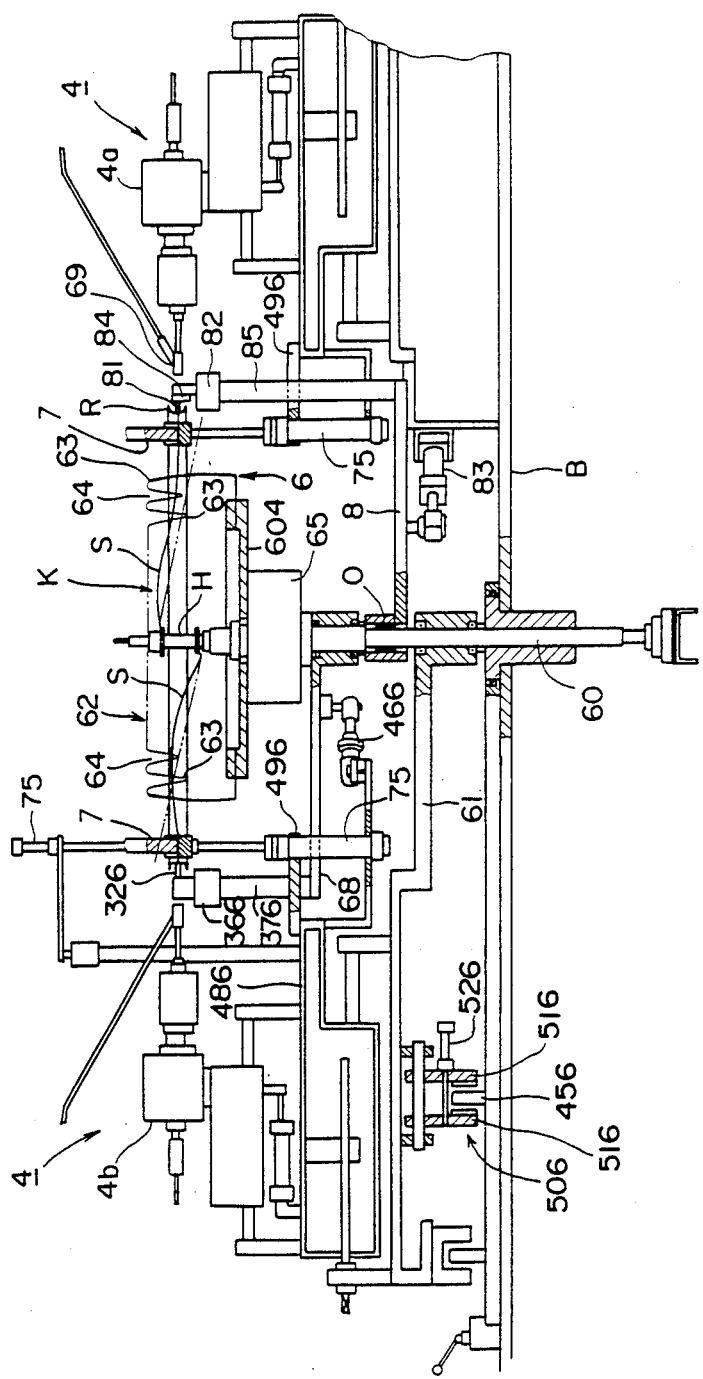
Figure 48:
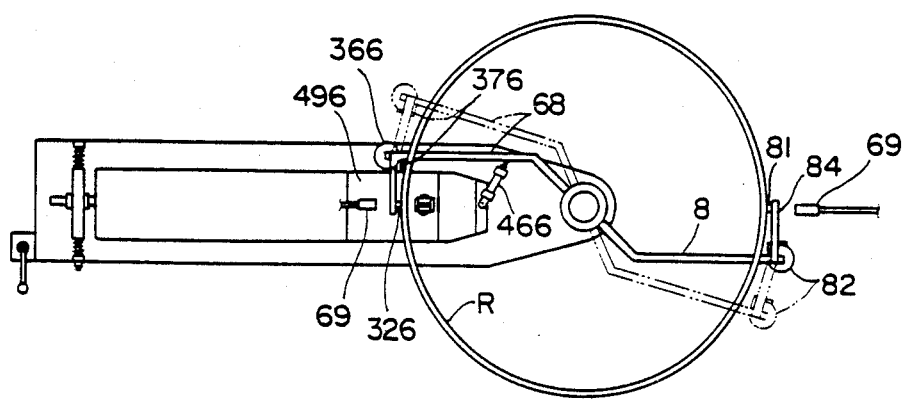
Figure 49:
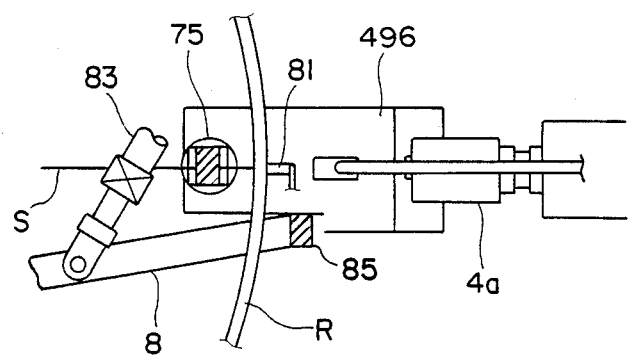
Figure 50:
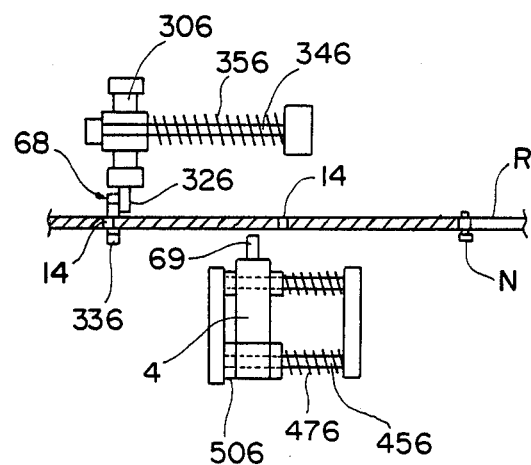

FIG. 43 illustrate a skeleton type nipple inserting device;
FIG. 44 illustrates a further embodiment of a skeleton type nipple inserting device;
FIG. 45 illustrates essential parts of an auxiliary moving body;
FIG. 46 illustrates essential parts of a brake device;
FIG. 47 is a schematic sectional view of the nipple inserting device;
FIG. 48 is a plan view of essential parts thereof;
FIG. 49 is a plan view of essential parts of a principal threadedly engaging device and
FIG. 50 illustrates the skeleton type in a modified example of the nipple inserting device.

This embodiment is practiced as the so-called aligning and leasing apparatus in which groups of spokes in the temporary assembly D having groups of spokes mounted on the hub H are aligned and thereafter the respective spokes are subjected to leasing into a preset crossing state, which apparatus is used in combination with a transfer device B, a temporary tightening device C for temporary tightening spokes onto the rim and a fastening device for temporarily tightened spokes.

DETAILED DESCRIPTION OF THE PREFERRED EMBODIMENTS

In the following, the devices in the respective steps will be described in detail.

(1) Aligning and leasing steps

Embodiments of the aligning and leasing steps in accordance with the present invention will be described with reference to FIGS. 1 to 15. First, the aligning step will be described.

In this embodiment, the hub H is clamped from above and below by a lower rotational shaft 1 and an upper retaining shaft 2, the retaining shaft being operatively connected to an output shaft 3 which is a linear drive means such as a hydraulic pressure cylinder or an air cylinder. Accordingly, when the hub H of the temporary assembly D is stood upright on the upper end of the rotational shaft 1 in the state where the output shaft 3 is moved upwardly and then the lower end of the retaining shaft 2 is brought into abutment with the upper end of the hub H by advancing downwardly the output shaft 3, the hub H of the temporary assembly D is clamped between the rotational shaft 1 and the retaining shaft 2.

In this embodiment, elastic layers 10 and 20 formed of rubber or the like are provided on the end surface of the rotational shaft 1 and on the end surface of the retaining shaft 2, the elastic layers facing to spoke mounting plates 11 and 12 provided on both ends of the hub H. Accordingly, when the rotational shaft 1 and the retaining shaft 2 face the spoke mounting plates 11 and 12 of the hub H, the ends of the spokes are pressed by the elastic layers 10 and 20, whereby the spokes are extended substantially horizontally from the spoke mounting plates 11 and 12. When the hub H is rotated by the rotational shaft 1, the spokes are radially aligned, and the spokes are temporarily held in the state radially aligned from the hub H due to friction between elastic layer 10, 20 and the end of the spokes.

The upper retaining body E is constructed such that pins 55 as a group of spacing-holding means 50 are disposed on the lower surfaces of a first annulus 5a disposed in the outer periphery of the retaining shaft 2 while adjusting to the arranging pitch of the first and second spokes 21 and 22. On the other hand, the lower retaining body E' is constructed such that pins 55' as spacing-holding means 50' are disposed on the upper surface of a second annulus 5b disposed in the outer periphery of the rotational shaft 1 while adjusting to the arranging pitch of the third and fourth spokes 23 and 24. The first annulus 5a is mounted on the retaining shaft 2 through a roller bearing 161, and the second annulus 5b is mounted on a driving shaft 111, which is advance-paired with the rotational shaft 1, through a roller bearing 16. Thus, the first and second annuli 5a and 5b which form principal portions of the retaining bodies E and E' are rotatable with respect to the hub H.

The pins 55, 55' have a diameter substantially in coincidence with the spacing between the radially aligned first and second spokes 21, 22 or the spacing between the third and fourth spokes 23, 24, which is smaller by about 0.1 mm than the spacing between the opposed spokes. When the pin 55, 55' are set as described above, the spokes are laid in an accurate radial position with respect to the center of the hub H when the pins 55, 55" are inserted into all of the spaces between the adjacent spokes. Even when the spokes are inclined a different direction from the aforesaid radial direction, the spacing between the adjacent spokes becomes moreover smaller but this reduction in spacing is prevented by the pins 55, 55'. Thus the spokes are maintained in a radially aligned state.

In the embodiment (FIG. 3), the retaining shaft 2 is in the form of a tubular shaft, which is internally provided with a sub-shaft 211 urged downwardly by means of a spring 221, the first sub-shaft 211 having at its lower end a recess 241 faced to the upper end of a shaft 471 of the hub H. The retaining shaft 2 is connected to the output shaft 3 through a tubular member 311, and the tubular member 311 and the rotational shaft 1 are rotatably connected.

On the other hand, the rotational shaft 1 is likewise in the form of a tubular shaft, which encases therein a sub-shaft 13 in the mode that is advance-paired with respect to the rotational shaft 1 and urged in an upwardly direction by means of a spring 121.

The rotational shaft 1 is fitted in the driving shaft 111 in the advance-paired state, and can be moved up and down within a fixed range in connection with the driving shaft 111 provided at a fixed position.

Therefore, at the lower end of the rotational shaft 1 is formed a vacant chamber 141, which is connected to a pressure source such as air pressure or hydraulic pressure Thus, the rotational shaft 1 is elevated with respect to the shaft 111 under pressure driving.

In the above-described embodiment, the clamping of the temporary assembly D and the operation of the retaining bodies E, E' are controlled by the operation of the linear driving means for driving the output shaft 3 and by the control of the pressure supplied to the vacant chamber 141. This operation will be described hereinafter.

First, in the initial state, the rotational shaft 1 is in the most upward state, and when the lower end of the shaft 471 of the hub H is fitted into a recess portion 15 of the sub-shaft 13 of the rotational shaft 1, the hub H is held in the upright state. At that time, the vacant chamber 141 is in the fully pressurized state, and when the output shaft 3 is moved downwardly under this state, the upper end of the shaft 471 abuts sub-shaft 211, and the hub H is clamped between subshafts 211 and 13 under pressure according to the biasing force of springs 221, 121.

Figure 4:
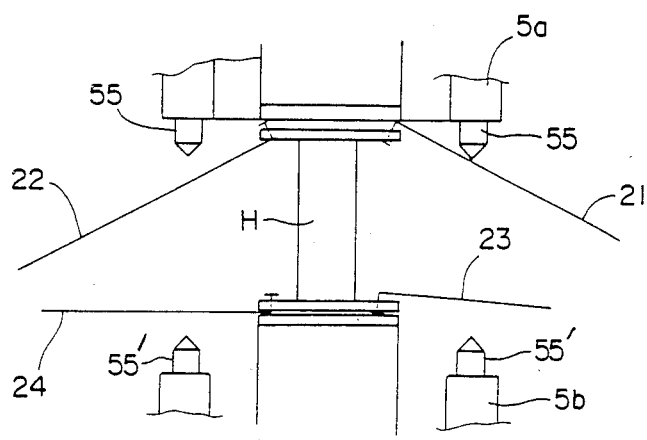
FIG. 4 illustrates the operation of the essential parts.
Figure 3:
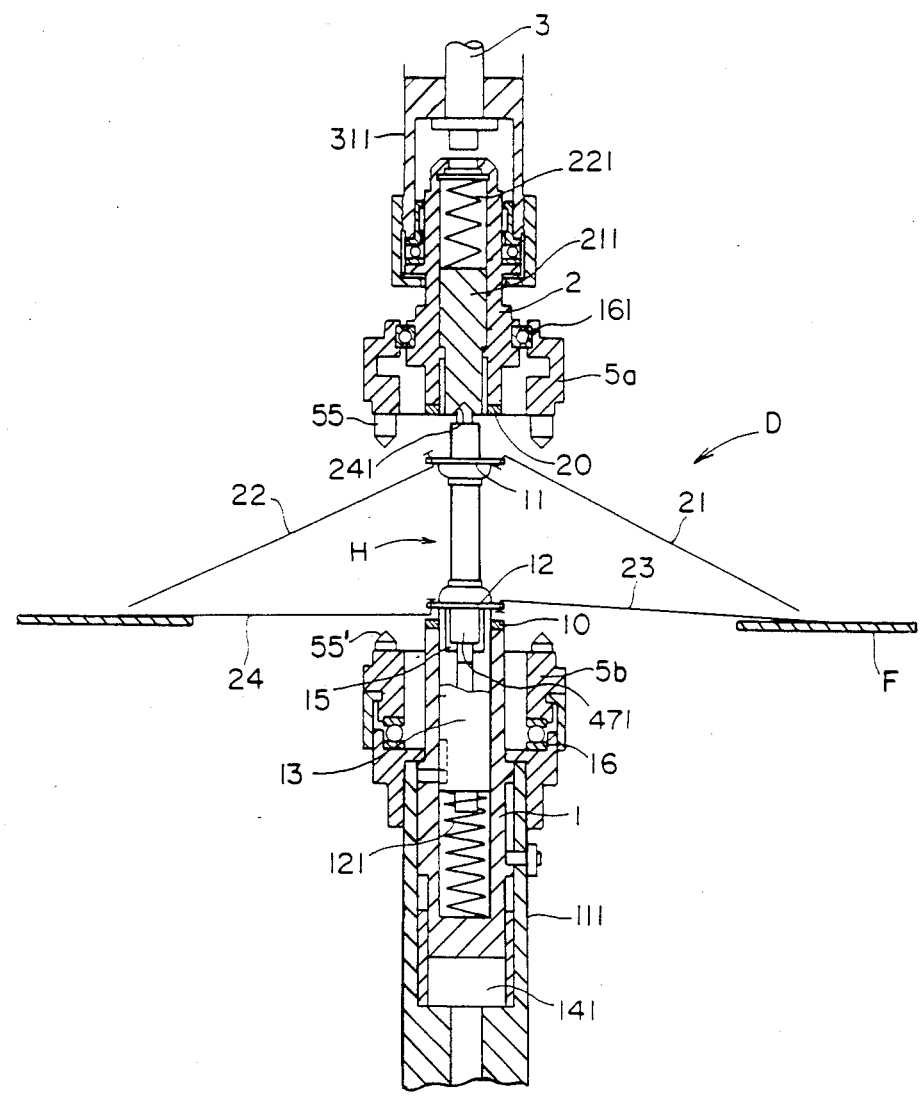
FIG. 3 illustrates essential parts of the aligning apparatus.

When the output shaft 3 is further moved down against the springs 221, 121, the elastic layer 20 on the end surface of the retaining shaft 2 contacts the spoke mounting plate 11 and at the same time, the elastic layer 10 on the end surface of the rotational shaft 1 contacts the other spoke mounting plate 12, as shown in FIG. 4. At that time, the foremost ends of the spokes are laid on the supporting plate F disposed in the outer periphery of the driving shaft 111.

Figure 5:
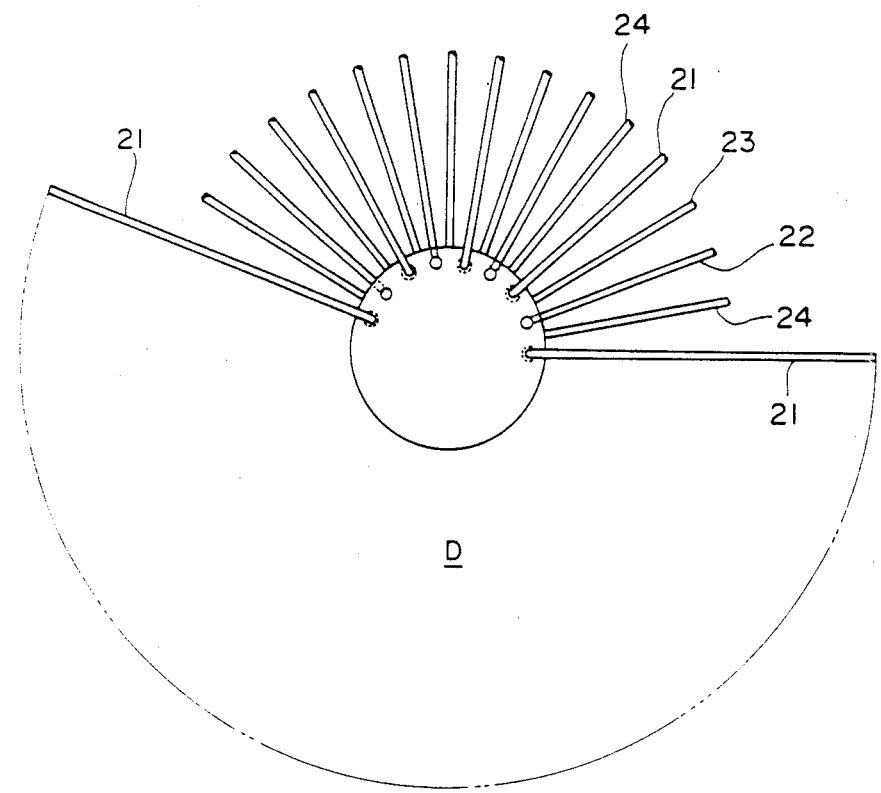
FIG. 5 is a plan view of a temporary assembly D in the state where spokes are aligned.

When the driving shaft 111 is rotated from the aforesaid state, the hub H is rotated to exert the centrifugal force on the spokes. When a predetermined rotational speed is reached, the spokes assume the aligned state as shown in FIG. 5. At that time, on the side of the upper retaining body E, the first and second spokes 21, 22 are raised while maintaining their horizontal attitude. When the temporary assembly D is being rotated or stopped in the state where the spokes are aligned, the convergent pins 55, 55' as the spoke spacing-holding means 50, 50' are pushed out to be protruded toward the spokes and the first and second spokes 21, 22 are inserted between the pins 55. (See the state indicated by the two-dot contour lines in FIG. 2)

Figure 6:
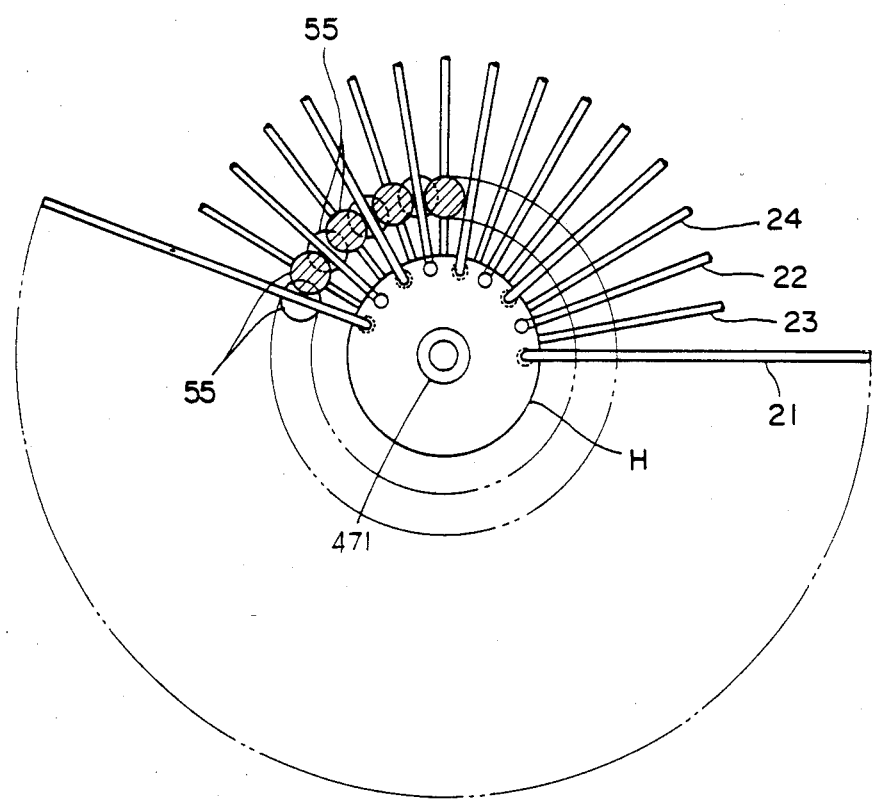
FIG. 6 illustrates the state where spokes are aligned and retained.
Figure 7:
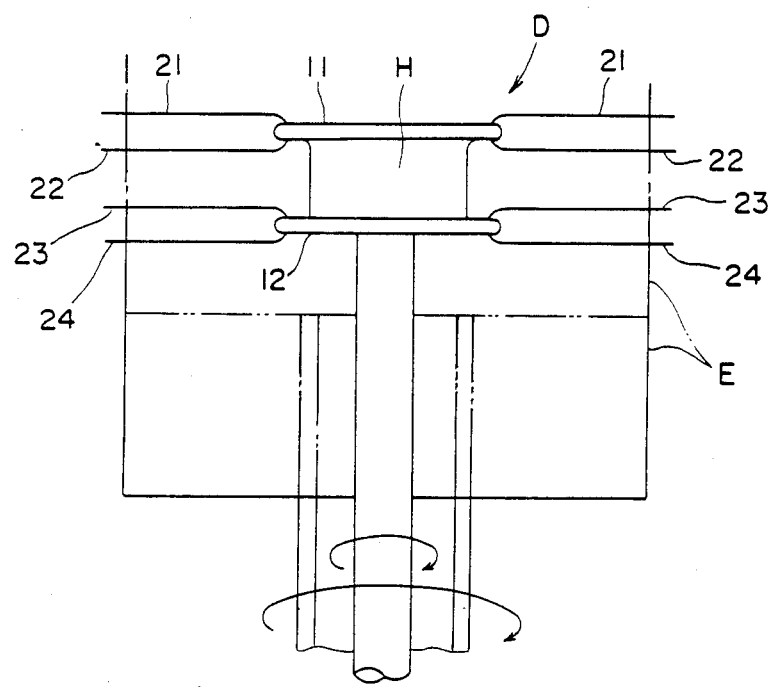
FIGS. 7 and 8 (prior art) illustrate conventional aligning apparatus.
Figure 8:
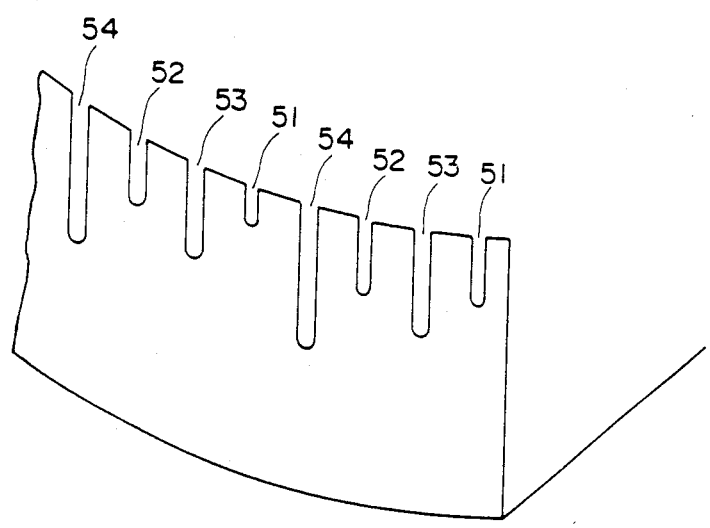
Figure 9:
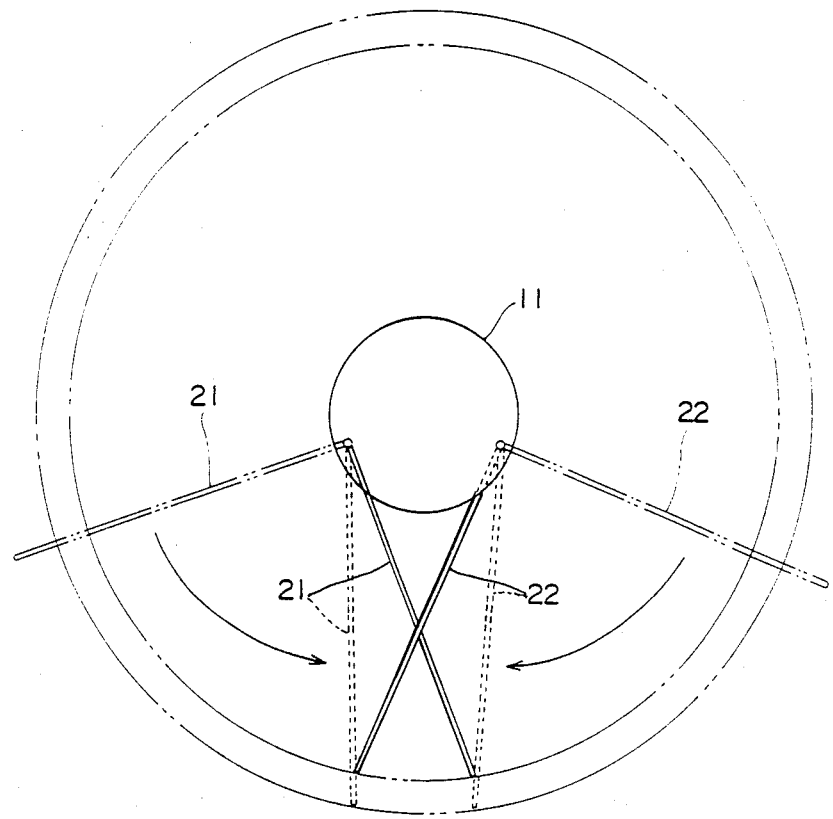
FIG. 9 illustrates the skeleton type spoke-leasing.
Figure 10:
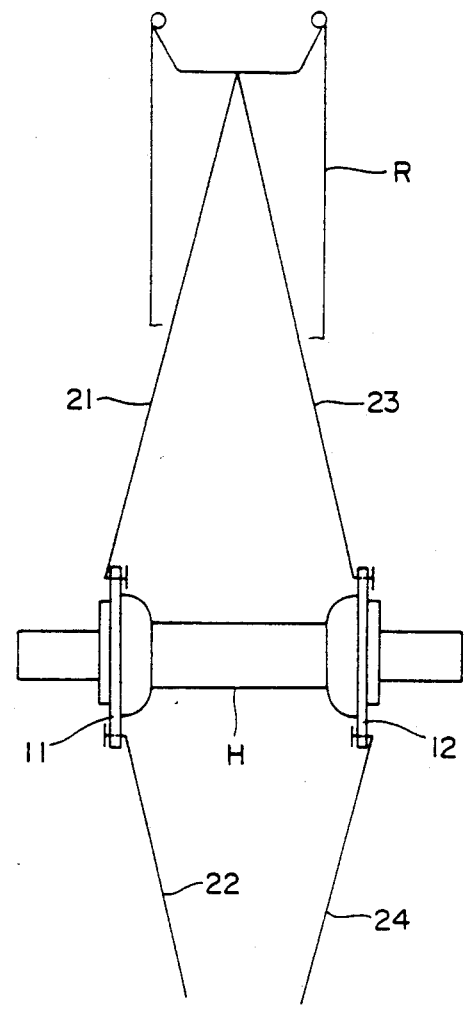
FIGS. 10 and 11 illustrate a wheel for a bicycle to which leasing is applied.

Next, when in the state where the driving shaft 111 is in the rotation or the rotational shaft is stopped, pressure of the vacant chamber 141 is dropped to advance the output shaft 3, the rotational shaft 1 is moved downwardly and the lower third and fourth spokes 23, 24 are inserted between the pins 55', of the lower retaining body E'. Thereby, every spoke is held in the aligned state as shown in FIG. 6 by the pins 55, 55' of the retaining bodies E, E.

While in the above-described embodiment, the elastic layers 10, 20 are provided on the end surfaces of the rotational shaft 1 or retaining shaft 2, it will be noted that these elastic layers need not always be provided as long as the hub H is rotatably driven.

Next, the leasing step will be described.

Figure 1:
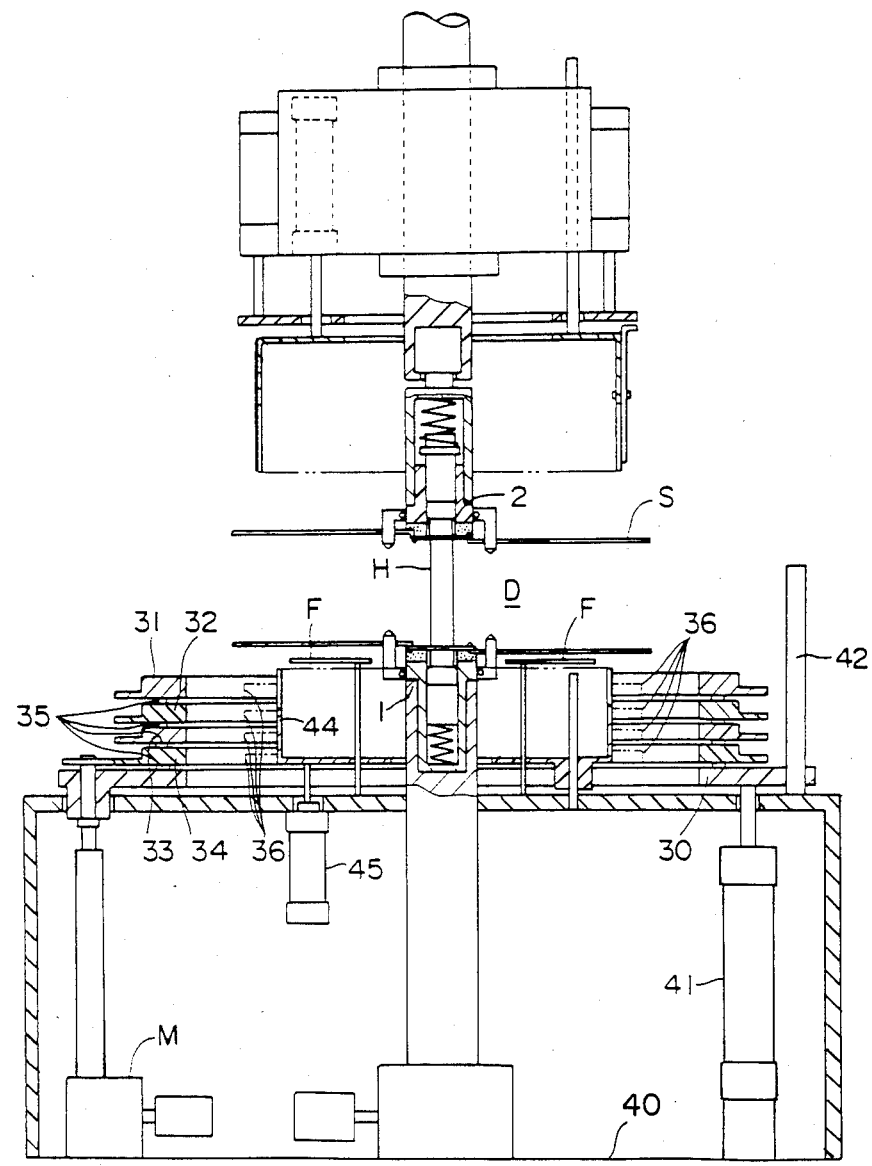
FIG. 1 illustrates essential parts of apparatus for carrying out the aligning and leasing.
Figure 2:
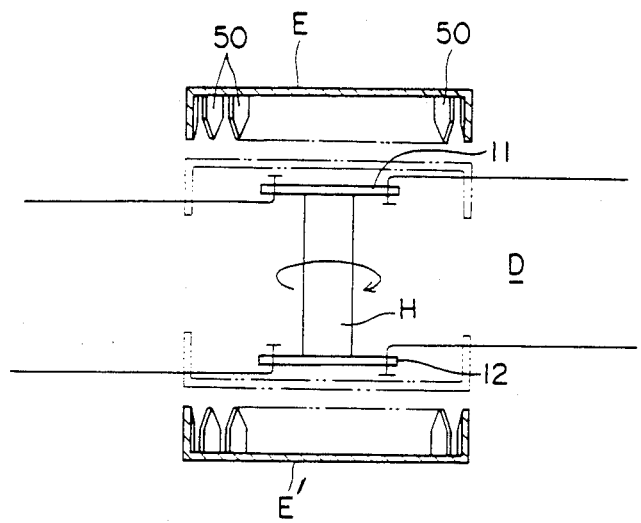
FIG. 2 illustrates the principles of the aligning apparatus.

The previously described operation has been continuously and automatically carried out. The supporting annuli are individually rotated by individually corresponding drive means M as shown in FIG. 1. FIG. 1 merely shows the relationship between the fourth supporting annulus 34 and one drive means M, omitting others. Likewise has been the previously described prior art, the annulus is relatively rotatably supported by ball 35 and the entire structure thereof is supported by the elevating frame 30. (See FIG. 12.)

This elevating frame is elevated by means of a first air cylinder 41 provided on the bed 40. Since the bed 40 is cylindrically paired with a guide post 42, the elevating frame 30 is elevated while maintaining its horizontal state according to the operation of the first air cylinder 41.

The rotational shaft 1 for supporting the hub H is provided in the central portion of the elevating frame 30, and an annular spoke supporting body 44 is disposed between the rotational shaft 1 and the elevating frame 30, the spoke supporting body 44 being elevated by means of a second air cylinder 45.

Figure 14:
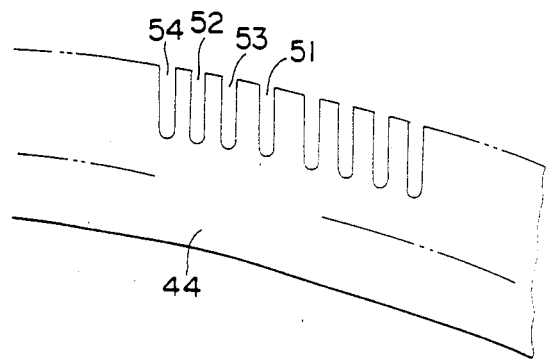
FIG. 14 illustrates essential parts of a spoke supporting body.

As shown in FIG. 14, the spoke supporting body 44 is provided with four groups of notches, i.e., a first notch 51 to a fourth notch 54, into which a first spoke 21 to a fourth spoke 24 are individually fitted, the notches being arranged so as to register with portions in the neighborhood of the foremost ends of the first spoke 21 to the fourth spoke 24 when the spokes of the temporary assembly D are rotated to the state immediately before the spokes are crossed (hereinafter referred to as the intermediate setting state). Accordingly, in the intermediate setting state, the first spoke 21, the second spoke 22, the third spoke 23 and the fourth spoke 24 are registered with the first notch 51, the second notch 52, the third notch 53 and the fourth notch 54, respectively.

In the state of the operation where the temporary assembly D in the spoke radially aligned state is supported on the rotational shaft 1, the spokes are individually supported by the supporting portions 36 of the corresponding first supporting annulus 31 to the fourth supporting annulus 34, and when the first supporting annulus 31 to the fourth supporting annulus 34 are relatively rotated from said state by the drive means M, they are moved to the intermediate setting state, under which state the first supporting annulus 31 to the fourth supporting annulus 34 are stopped.

Then, the spoke supporting body 44 is raised by the second air cylinder 45 and the spokes are held in the intermediate setting state, after which the elevating frame 30 is moved downwardly according to the operation of the first air cylinder 41. In this state of downward movement, the first supporting annulus 31 to the fourth supporting annulus 34 are relatively rotated whereby the first spoke 21, the second spoke, the third spoke 23 and the fourth spoke 24 are brought into registration with the supporting portion 36 of the second supporting annulus 32, the supporting portion 36 of the first supporting annulus 31, the supporting portion 36 of the fourth supporting annulus 34 and the supporring portion 36 of the third supporting annulus 33, respectively.

Thereafter, the elevating frame 30 is moved upwardly and the spokes are supported by the supporting portions 38, after which the spoke supporting body 44 is moved downward by the second air cylinder 45 and in this state the first supporting annulus 31 to the fourth supporting annulus 34 are relatively rotated.

With this, the respective spokes are to be subjected to leasing in a predetermined state as previously mentioned.

Figure 15:
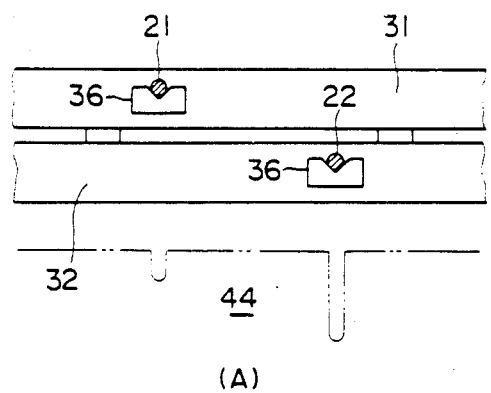
FIG. 15 illustrates the operation of essential parts of leasing apparatus.
Figure 15:
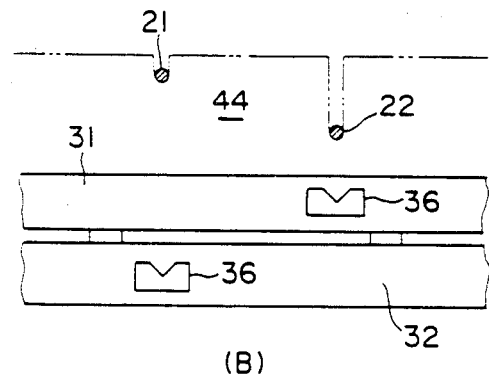
Figure 15:
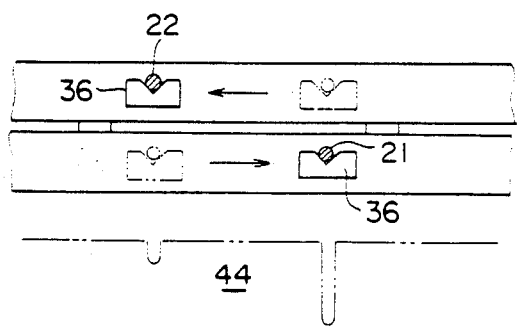

With respect to the above-described series of operations, the relationship between the first and second spokes 21, 22 is shown by way of an example in FIG. 15.

When the elevating frame 30 supporting annuli 31 through 34 is raised with the temporary assembly D in the spoke aligned state held on the rotational shaft 1, the state as shown in FIG. 15 (A) results. Subsequently, the spoke supporting body 44 is raised, the first to fourth spokes 21 through 24 are held in the first to fourth notches 51 through 54, and at the same time the elevating frame 30 is moved downwardly and subsequently the first to fourth supporting annuli 31 through 34 are relatively rotated. Then, the FIG. 15 (B) state results. Thereafter, the elevating frame 30 is raised, the spoke supporting body 44 is moved downward, the supporting portions 36 are fitted in the spokes and the first to fourth supporting annuli 31 through 34 are relatively rotated through a predetermined angle. Then, the FIG. 15 (C) state results.

Programs are preset so that the drive means for the first to fourth supporting annuli 31 through 34, the second air cylinder 45 for the spoke supporting body 44 or the first air cylinder 41 for the elevating frame 30 should be actuated at predetermined timing.

It is to be noted in the above-described embodiment that the hub H of the temporary assembly D is designed to be held even by the retaining shaft 2 opposed to the rotational shaft 1, and therfore the attitude for holding the temporary assembly D is stabilized.

(2) transfer step for an assembly of the hub and spokes already subjected to leasing FIGS. 20 and 21 show a device for transferring an assembly of the hub and spokes already subjected to aligning and leasing from the aliging and leasing device to a temporary tightning apparatus Y.

In this embodiment, as shown in FIG. 20, a retaining frame 56 is mounted on an elevating body 46 which operates integrally with an elevating shaft 47 so that the retaining frame 56 may be relatively elevated with respect to the elevating shaft 47, tongues 57 and 58 downwardly protrude from the peripheral edge of the retaining frame 56, and a pivotal fulcrum 591 of a hook 59 is provided in the middle of the tongue 57.

The hook 59 is provided with a spring 592 for always applying a biasing force in a closing direction, and the upper end of the hook 59 is projected from the upper end of the retaining frame 56 and opposed to a forcibly opening actuator 37. In this case, the actuator 37 and the spring 592 functions as the already described hook actuator device 7A.

The actuator 37 is set by an air cylinder 713 so that the former may be relatively elevated with respect to the retaining frame 56. When the actuator 37 moves close toward the retaining frame 56, the upper end of the hook 59 is pushed and forced into an open position against the spring 592.

Actual operation of the above mentioned device for transferring the hub and spoke already subjected to leasing will be further described.

Normally, the elevating shaft 47 also functions as a retaining shaft for the leasing apparatus, and the upper portion of the hub H of the assembly K is fitted in the elevating shaft 47. In this state, the arrangement of the spokes is in coincidence with that of the tongues 57 and 58. When the retaining frame 56 is independently moved downwardly from the elevating shaft 47, the upper end of the hook 59 is disengaged from the actuator 37, and openings 581 of the tongues 57 and 58 to which hook-like portions 593 correspond are closed by springs 592.

When the retaining frame 56 is further moved downwardly further, the spokes are fitted into the openings 581 of the tongues 57 and 58, and the group of spokes are set in the leasing state. The lower fourth spokes 24, are moved into the hook-like portions 593 of the hooks 59 agaist the springs 592, and thereafter the hooks 59 are returned to its original position by the springs 592 so that the hooks hold the fourth spokes 24.

When the elevating body 48 is then raised, the fourth spokes 24, are retained by the retaining frame 56 in the peripheral edge of the hub H and spoke assembly K through the hook 59, and the shaft portion of the hub H and the elevating shaft 47 are fitted to each other in the central portion thereof, whereby the entire structure is integrally raised. Thereafter, the assembly K is transferred to and placed on its destination by the horizontal movement of the travelling device 5A and the vertical movement of the elevating body 48.

When the actuator 37 is moved downwardly after completion of the transfer of the assembly K, the upper end of the hook 59 comes into abutment with the actuator to open the hook-like portion 593. When the elevating shaft 47, the retaining frame 56 and the elevating body 48 are returned to their original position, various stations assume their initial state.

In this state of the operation, it is designed so that the elevating shaft 47 may be moved up and down in connection with the travelling device 5A, the elevating body 48 may be moved up and down relatively with respect to the elevating shaft 47, and the retaining frame 56 and actuator 37 may be moved up and down relatively with respect to the elevating body 48. This elevating operation is progressed at a predetermined timing by drive means such as an air cylinder.

Figure 11:
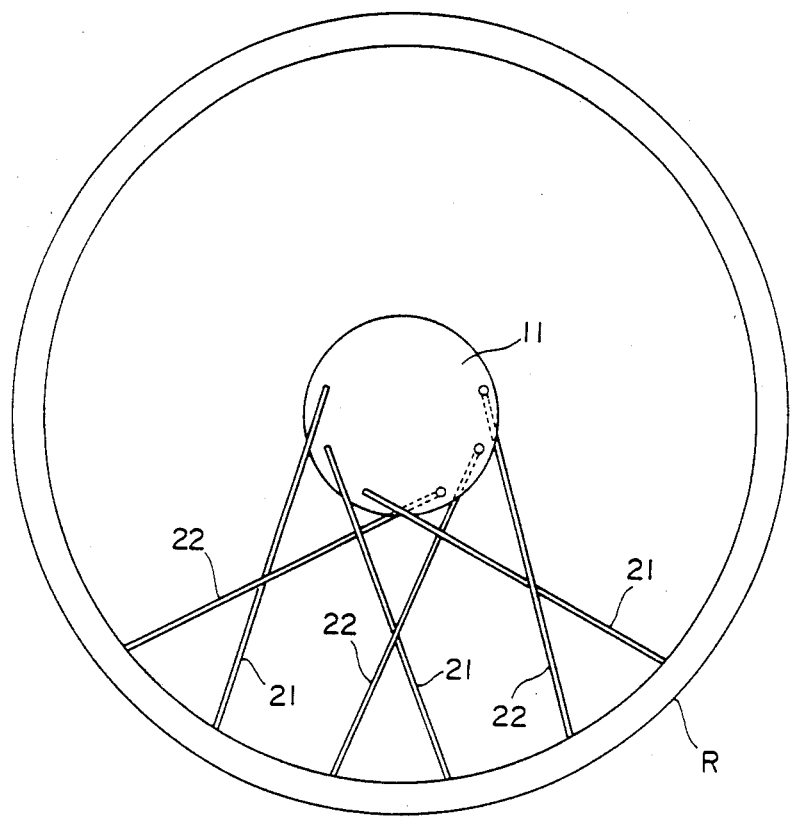
Figure 12:
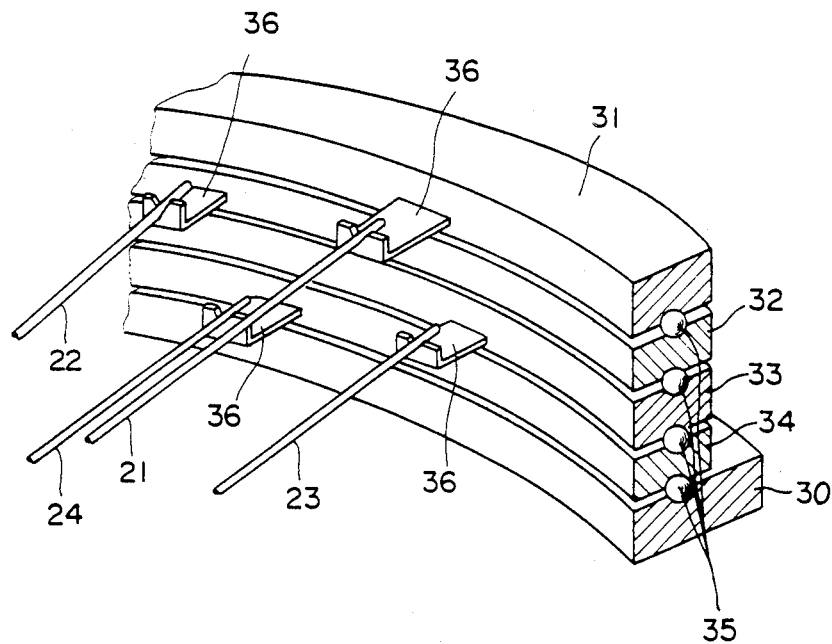
FIG. 12 (prior art) illustrates essential parts of apparatus for carrying out a conventional leasing method.

In the leasing state of the assembly K, the intermediate portions of the spokes are in the crossed state as shown in FIG. 11, and therefore the openings 581 of the tongues 57, 58 can be made to correspond to the crossed portion, in which case, the quantity of the tongues 57, 58 and hooks 59 can be one half of those described in the previously described embodiment, thus further simplifying the construction.

It is to be noted in the hook actuating device 7A that other than the above-described structure, the structure wherein the hook 59 is integrally connected so as to be oscillated by the drive means such as an air cylinder can also be employed.

(3) Temporary tightening step

In the apparatus according to this embodiment (FIG. 22 and FIGS. 24 through 29 and 47), various devices are mounted on the bed B. When the assembly K is horizontally set on the bed, nipples N are connected with the rim R and nipples N provided in advance concentrically on the outer periphery thereof are successively connected. As shown in FIGS. 24 and 25, the apparatus comprises a retaining device for retaining the rim R, a securing frame 8 for securing the assembly K within the rim R, a fifth air cylinder 83 (FIG. 47) for intermittently rotating the securing frame, a clamping device 7 for securing the free ends of spokes in a predetermined attitude, and an inserting device 4 for inserting nipples N from spoke holes 14 formed in the rim R and threadedly engaging them onto threaded portion 39.

In the following, various devices will be described in detail.

First, as shown in FIG. 25, the rim retaining device comprises a plurality of supporting rods 514, for slidably supporting the outer periphery and peripheral side edge of the rim R, an L-shaped driving arm 8 which is rotated integral with the assembly K and the securing frame 6 by a fifth air cylinder 83 which will be described later, and a pin 81 is provided on the upper end of the driving arm. When the rim R is fitted in a horizontal attitude into the supporting rods 514, with the valve hole 14 and the pin 81 fitted to each other, the rim R is fixed in a predetermined attitude.

Next, as shown in FIG. 24, the securing frame 6 comprises a rotatable table 604 having locating elements 62, whose number in quantity is the same as that of the spokes disposed on the upper surface thereof, hooks 621 provided on the locating elements 62, corresponding in number to the spokes S positioned at the upper portion in FIG. 24, and a tubular shaft 67 projects from the central portion of the rotatable table 604. The rotatable table 604 (FIG. 24) is intermittently rotated by a fifth air cylinder 83 (see FIG. 47).

The relationship between the locating element 62 and the hook 621 is such as that shown in FIG. 26. The hook 621 is biased in a direction of closing a securing groove 622 of the locating element 62 by means of a spring 66. The foremost end (upper end) of the hook 621 also forms a hook-like configuration.

Accordingly, the assembly K inserted into the securing frame 6 of the temporary tightening device is designed so that when the spokes are secured in the leasing state by the locating elements 62 and the assembly K is inserted into a proper position of the securing frame 6, the upper spokes S are hooked by the hooks 621.

Thereby, the spokes and the spoke holes 14 in the rim R are set in the proper relative position.

As shown in FIGS. 24 and 27, the clamping device 7 comprises a pair of clamps 71, 72 (FIG. 28), and a 4th air cylinder, 75 for moving the clamps, the clamping device 7 being positioned opposite to the inserting device 4.

The facing position between the clamps 71 and 72 is defined by defining the highest position of one clamp 71 by means of a stopper 76 and by applying to the other clamp 72 a press-down force which is smaller than the force for upwardly driving the clamp 71. Further, for making a spoke clamping area by the clamps 71, 72 in a fixed range, the width of the clamp is set to a predetermined value. In the state where one spoke is clamped by the clamping device, the spokes are curved as shown in FIG. 27 and the free end of the spoke is positioned inwardly of the rim R and in the neighbourhood of the spoke hole 14.

Finally, the inserting device 4 is well known. Every time the tightening operation is effected, the nipple N is projected at the free end of the end tool 69 for the automatic thread-engaging operation.

In the temporary tightening device provided with the above-described devices, in the state where the assembly K is set to the securing frame 6, the spoke hole 14 closest to the valve hole BH (FIG. 41) and the spoke opposed thereto are in registration with the end of tool 69 of the inserting device 4. The spokes are inclined considerably as compared with those which have already been fastened, and therefore, the free ends thereof are positioned further internally of the inner periphery of the rim R.

Then, when the clamping device 7 (FIG. 24) is actuated, the clamps 71 and 72 of this device cause the spokes to be curved as shown in FIG. 27. Since the clamping device composed of the clamps 71 and 72 is properly set as shown in FIG. 28 in connection with the rim R, the free end of the spoke is opposed to the spoke hole 14 at that time. When at that time the inserting device 4 is actuated, the nipple N is projected inwardly from the spoke hole 14 as shown in FIG. 29, and the nipple N is screwed onto the threaded portion 39 in the free end of the spoke. In this way, one spoke is temporarily tightened.

Subsequently, the assembly K is rotated by one pitch by the fifth air cylinder 83 (FIG.47), and the succeeding spoke is opposed to the inserting device 4. The above-described series of operations are progressed so that nipples are temporarily tightened in a manner similar to the above. Thereafter, upon the intermittent rotation of the rotatable table 604 (FIG. 24), the threaded engagement of the nipple is effected for each spoke, and when the driving arm 8 (FIGS. 47 and 25) is approximately fully rotated, the wheel is assembled into the temporarily tightened state.

In bringing the nipples N into thredded engagement with the upper spokes S, the free ends of these spokes have been pulled down by the hook 621 (FIG. 26) but as the threaded engagement of the nipples N caused by the inserting device 4 (FIGS. 24 and 47) proceeds a tension acts on the spokes S to automatically release the engagement between the hook 621 (FIGS. 24 and 26) and the spokes.

The configuration of the hook-like portion is slightly inclined in a direction of slipping out the spoke.

The clamping force caused by the clamps 71, 72 of the clamping device 7 (FIGS. 24 and 27) also has been set to a predetermined value. When a predetermined tension acts on the spoke by the fastening of the nipple N by the inserting device 4 (FIGS. 24 and 27), the clamped portion is opened.

(4) Fastening step for temporarily tightened spokes

In the following, the fastening apparatus for temporarily tightened spokes used for the above-described steps shown in FIGS. 30 through 41 will be described.

First, the fastening apparatus will be described in the skeleton type wherein the rim is linearly developed as shown in FIG. 30.

A driver device 9 is provided with a pivotable pawl 95 opposed to a stopper 91, as shown in FIG. 30. A tool 92 is engaged with nipples N in the state where the nipple N is clamped by the stopper 91 and pawl 95. Prior to the initial contact between the nipple N and the stopper 91, the pawl is spaced from the rim R a distance greater than the projection of the nipple N.

According to this skeleton shown, the pawl 95 remains withdrawn till the nipple N comes into abutment with the stopper 91 after the rim R has been moved. Therefore, it is free from the inconvenience that the temporarily tightened nipple N comes into abutment with the pawl 95 prior to the abutment of the nipple N with the stopper 91 to change its attitude, giving rise to an error in engagement between the tool 92 and the nipple N. Moreover, at the time the tool 92 engages the nipple N, the nipple N is clamped by the pawl 95 and stopper 91, and therefore, the tool 92 and the nipple N are accurately placed in correspondence with each other at the time of fastening it, thus being possible to prevent substandard fastening.

In the embodiment shown in FIG. 31 through 41, the wheel W rotates in one direction and the rim takes a circular moving locus. Therefore, the driver device 9 is positioned on the radial line of the rotational center of the wheel W.

As a whole, the wheel W is held by a wheel clamp 915 composed of a first and a second clamps 941 and 942 which are circularly adjusted to the size of the wheel W. The first clamp 941 is disposed on the upper surface of the bed BB and the second clamp 942 is movably up and down and rotatably mounted on an arch 943 stood upright on the upper surface of the bed. (FIGS. 31 and 32)

In the neighborhood of the peripheral edge of the first clamp 941 on the upper surface of the bed BB are disposed four driver devices 9, 9', 9" and 9"' in the relation as previously described. The wheel W clamped between the first clamp 941 and the second clamp 942 is intermittently driven in one direction by means of a driving device for driving the first clamp 941. When the first and second clamps are stopped, the driver devices are actuated to fasten the nipples N of the spokes temporarily assembled on the wheel W into their final state.

For automatically progressing various steps after the wheel W has been attached, the apparatus in this embodiment comprises an initial position sensor, the driver devices 9, the driving device for intermittently driving the wheel in the clamped state, and a computer for controlling the operating timing thereof.

In the following, these will be individually described.

(1') Driving device

As shown in FIGS. 33 and 34, the driving device comprises an upright shaft 944 which is held in the turning paired relation by the bottom and top surfaces of the bed BB, projects from the aforesaid top surface and has a first clamp 941 mounted on the upper end thereof, a worm wheel 945 mounted on the lower end of the upright shaft, and a pulse motor 947 having a worm 946, which meshes with the worm wheel 945, connected to an output shaft of the pulse motor. The rotation of the pulse motor is defined according to an output signal of the computer, and the upright shaft 944 and the first clamp 941 operatively connected to the shaft 944 are intermittently rotated. Accordingly, the temporarily assembled wheel W clamped between the first and second clamps 941, 942 is also intermittently rotated.

(2') Driver device 9

Since four driver devices have the same structure, and therefore, one of them will e described in detail hereinafter.

a. Entire Construction

As shown in FIGS. 35 and 36, the driver device comprises a tool 92 corresponding to a nipple N, a driving shaft 94 which is rotated integral with the tool and driven by a motor MM, a retaining tube 96 for rotatably holding the driving shaft, a nipple clamp 97 provided at the foremost end of the retaining tube 96, and a cylinder 93 for retractably holding the retaining tube 96. The cylinder 93 is inserted into a stationary tube 98 having a larger diameter than that of the cylinder 93, and the middle portion of the cylinder 93 is supported by a spherical paired linking device 985 so that the neck thereof may be shook in both horizontal and vertical directions, and the end of the cylinder 93 closest to the rim is supported freely by means of four springs 99, 99', 99" and 99"' disposed of which only 99 and 99' are shown radially on the end of the stationary tube 98 closest to the rim. The balance of the bias forces of the springs 99 is preset to a predetermined value, and normally, the cylinder 93 is coaxial with the stationary tube 98.

b. Nipple clamp 97

The nipple clamp 97 (FIG.35) comprises a movable tube 921 retractably mounted on the foremost end of the cylinder 93 and through which the tool 92 extends, a stopper 91 into which a tubular base 922 (FIG.36) is fitted to the end of the movable tube 921 closest to the rim in the advance-paired state, a cover plate 923 for confining the tubular base so as not to be slipped out, and a pawl 95 provided on one end of the cover plate.

The end of the tool 92 closest to the rim outwardly extends through the tubular base 922 and cover plate 923, and stopper 91 likewise extenally extends through the cover plate 923. The stopper 91 is opposed to the pawl 95 in the horizontal direction, and in the intermediate portion therebetween is projected the end of the tool 92 closest to the rim. The pawl 95 has a pivotal point in the cover plate 923 and is always biased by means of a spring 920 interposed between the pawl 95 and the cover 923 in an opening direction (in the direction of the end of the driver device closest to the rim).

The movable tube 921 is biased forwardly by means of a first spring 89 interposed between the movable tube 921 and the retaining tube 96, and the stopper 91 is likewise biased forwardly by means of a second spring 79 interposed between the retaining tube and the tubular base 922, the bias force of the first spring 89 being set greater than that of the second spring 79.

c. Forward and backward driving

The retaining tube 96 is moved forward and backward at a fixed stroke by supplying hydraulic pressure to a first hydraulic pressure chamber 28a and a second hydraulic pressure chamber 28b formed between the retaining tube 96 and the cylinder 93 from corresponding ports, and the timing of the stroke and movement is set as required by an output signal from a computer which controls a hydraulic pressure source.

d. Operation

The thus structured driver device 9 is mounted on the supporting frame 90 provided on the supper surface of the bed BB. The installing condition of the supporting frame 90 is set under a predetermined condition whereby fulfilling the relative position between the wheel W and the driver device 9 as previously described. The operation of various stations is controlled by the computer so that they operate as follows:

By th initial position sensor which will be described in detail later, the nipple N of the wheel W attached to the wheel clamp 915 is initially positioned spaced apart at a predetermined distance from the stopper 91 of the nipple clamp 97, as shown in FIGS. 37 and 38.

As the wheel clamp 915 starts rotating, the retaining tube 96 is moved forward by the hydraulic pressure from the hydraulic pressure source, and the stopper 91 abuts against the outer peripheral surface of the rim R. Thereafter, the retaining tube 96 is moved forward through a fixed amount against the second spring 79 and once locked at that forward position, at which position the stopper 91 is confined and opposed between the pawl 95 and the outer peripheral surface of the rim R with a fixed clearance therebetween, as shown in FIG. 39. When the wheel W is further rotated from that position, (see FIG. 41) the nipple N abuts against the stopper 91, and the cylinder is rotated through a fixed angle about the spherical link 985. In this rotating state, the return-biasing force of the supporting springs 99, 99 has been exerted. A swing-angle of the cylinder 93 caused by the aforesaid rotation assumes constant, the wheel clamp 915, that is, the rotation of the wheel W is stopped and at the same time, the retaining tube 96 is further moved foward by the hydraulic pressure whereby the pawl 95 abuts against the rim R and the head of the nipple N is clamped between the stopper 91 and the pawl 95. When the retaining tube 96 is further moved forward so that the nipple N in the clamped state comes into engagement with the end of the tool 92 closest to the rim, the forward movement of the retaining tube 96 is stopped and the motor MM is driven to fasten the temporarily tightened nipple N. When the torque of this fastening force reached a predetermined value, the driving of motor MM is stopped by a device for controlling the fastening torque. (not shown in figure.)

Thereafter, when the retainig tube 96 is moved backward and returned to its initial position, the engagement between the nipple N and the nipple clamp 97 is released, and the cylinder 93 is also returned to its initial position by means of the supporting springs 99. At the same time, the wheel W starts rotating, whereby after the nipple N has passed the stopper 91, the above-described series of operations are progressed to clamp and fasten the succeeding nipples N.

According to the driver device of this embodiment, the cylinder 93 is supported in the spherical paired state and is supported in both horizontal and vertical directions by the sopporting springs 99, 99', 99" and 99''', and the stopper 91 and pawl 95 have their section set to the form wherin the inside there of has a shape of an angle recess, as shown in FIG. 40. Therefore, both the nipple N corresponding to the spoke S connected to one plate of the hub H and the nipple N corresponding to the other spoke S may be fastened by the single driver device.

Because, at the time the nipples N, disposed in the zigzag fashion, cause the cylinder to be swung in the vartical direction by the guiding action of the angle-recess and the cylinder 93 is rotated through a fixed angle from its initial attitude, the nipple N is clamped by the nipple clamp 97. The attitude of the cylinder 93 at that time nearly coincides with that of the corresponding spoke.

Also, in the nipple clamp 97, since the angle-recess of the other pawl 95 faces to the nipple N in the state where the nipple N is positioned in the angle-recess of the stopper 91 which forms one clamping portion, no clamping error occurs. Moreover, this clamping operation is created merely by linear motion of the retaining tube 96 assuming stability of the operation.

Moreover, in this embodiment, the period for stopping rotation of the wheel W is set by the rotational angle of the wheel clamp 915. More specifically, the amount of movement of the nipple N is defined by setting one pitch of the rotational angle, in which the wheel W rotates further through a fixed fine angle beyond the abutting one of the nipple N against the stopper 91 until stopping. In addition, timing is adjusted to the aforesaid stopping period to bring the tool 92 and pawl 95 (FIG.35) into correspondence to the nipple N. Accordingly even if the size of a wheel is varied to vary pitches of the nipples N, the period or time at which the wheel W stops is accurate according to the driver device 9.

It is to be noted in the device for moving the driver device 9 forward and backward that an arrangement may be combined wherein a supporting bed 999 (FIG.35) supporting the stationary tube 98, and this stationary tube 98 are advance-paired to be moved forward and backward with respect to the wheel W, and the stationary tube 98 is moved forward and backward also by combining straight-ahead driving means such as an air cylinder, other than the method for exerting the hydraulic pressure on the first and second hydraulic chambers 28a and 28b at a predetermined timing as described above at c.

In case of the aforesaid combination, it is possible to make the forward movement until the stopper 91 comes into initial abutment against the rim the forward operarion of the stationary tube 98 caused by the straight-ahead driving means and to make the afterward movement of the nipple clamp 97 and the advancing movement of the tool 92 caused by the pressurizing of the first and the second hydraulic chambers 28a and 28b, in which case the amount of operation of the retaining tube 96 may be less established (3) Initial position sensor As an initial position sensor, a sensor comprising a combination of a photoelectric switch and a computer is employed, and an object to be detected comprises a valve hole BH. The sensor is mounted on the driver device 9 and installed on the upper surface of the bed BB through the supporting frame 90 as shown in FIG. 31, and a first sensor 951 and a second sensor 952 which are formed from the photoelectric switches, respectively, are mounted on the driver devices 9 and 9 adjacent to each other.

Here, the second sensor 952 is provided to facilitate the nipple-fastening operation in the succeeding step with the relative position between the driver device 9 positioned at the downstream of the rotational direction of the wheel W and the valve hole BH set to be constant. The relative position between the stopper 91 and the second sensor 952 is set so that when the second sensor 952 detects the valve hole BH, the stopper 91 (FIGS. 39, 40 and 41) corresponds to the nipple N.

Accordingly, when the signal from the second sensor 952 is put into the computer, the output signal provided accordingly, is put into the driver device 9 from the computer, whereby when the nipple clamp 97 and tool 92 move forward till it reaches the initial position of the wheel clamp 915, the driving device is stopped in accordance with a command from the computer and the fastening operation advances.

Thereafter, the rotational angle of the wheel clamp 915, that is, the rotational angle from the aforesaid initial stop position to the stop position for the succeeding fastening operation is set in accordance with the arranging pitch of the nipples N, and the nipples N, are successively fastened by the above-described operation.

The above-described operations are advanced simultaneously by four driver devices. When every ¼ of the group of nipples are fastened by the respective driver devices, the fastening of all the nipples is completed.

Incidentally, the time for completion of the fastening is determined on the basis of the number of nipples of the wheel preset. The frequencies of fastening operations are counted by the computer, and when the counted number is ¼ of the total number of nipples, the work termination signal is put into the driving device and the wheel clamp 915.

In this embodiment, the first sensor 951 is provided separately from the second sensor. The rotational speed caused by the driving device is varied by the steps of one wherein the wheel W is clamped by the wheel clamp 915 and the wheel is then rotated and the first sensor 951 detects the valve hole BH and the other wherein the second sensor 952 detects the valve hole BH. Until the first sensor 951 detects the valve hole BH, the wheel clamp 915 rotates at high speed, and thereafter, the speed is reduced to a rotational speed suited for intermittent rotation in connection with the fastening operation.

Accordingly, the setting of the initial position of the wheel W is carried out at high speeds by the combination of the first and second sensors 951 and 952, and in addition, during the fastening operation, the speed is set to a peripheral speed suitable therefor.

The photoelectric switches which form the first and second sensors 951 and 952 respectively comprise reflecting light detection type switches, each of which includes a light emitting portion and a light receiving portion, wherein when the valve hole BH registers with each sensor, the lifht from the light emitting portion passes through and therefore this light does not reach the light receiving portion, thereby generating a valve hole BH detection output.

(4') Computer

The computer controls the wheel clamp 915, the driving device, the driver devices, and the initial position sensor device, and puts operation commands into various devices.

(5') Step for inserting nipples into spoke holes prior to the temporary tightening step In the following, the embodiment of the aforesaid step will be described in connection with FIG. 43 through FIG. 50.

FIGS. 43 to 44 illustrate the nipple inserting apparatus in the skeleton type in which the rim is linearly developed.

In FIGS. 43 to 46, the rim R is punched with spoke holes 14, into which nipples are inserted from the inersting device 4. Thereafter, after the nipple N is temporarily tightened, the nipple N is finally fastened. In the skeleton view of FIG. 43, the nipple inserting device 4 and the auxiliary moving body 68 are positioned on the same side of the rim R, whereas in the skeleton view of FIG. 44, the inserting device 4 and the auxiliary moving body 68 are positioned on the opposite sides of the rim which will be described later.

Figure 13:
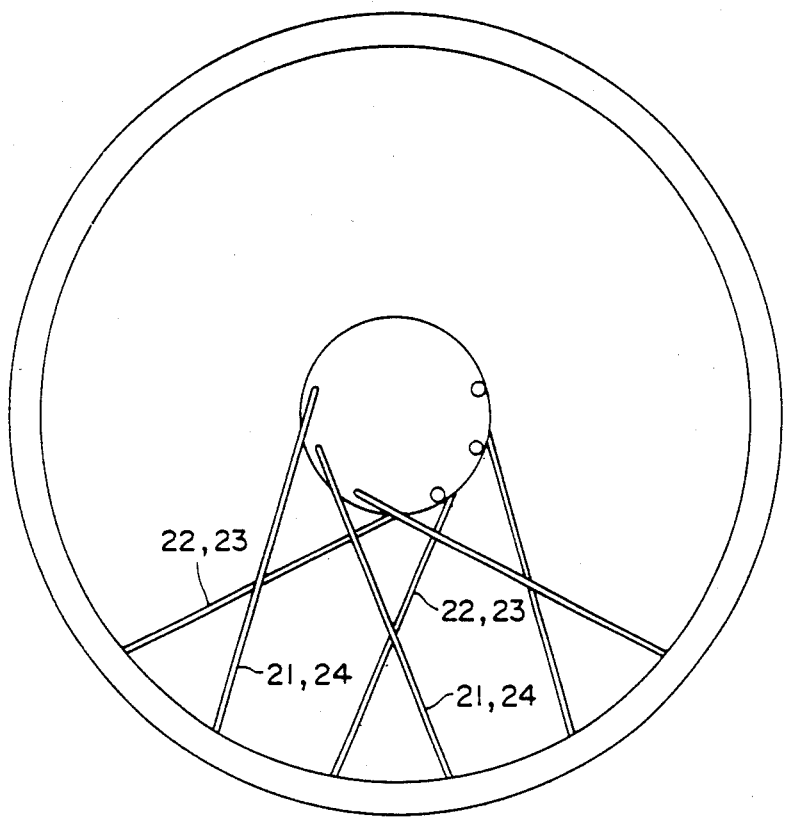
FIG. 13 illustrates a temporary assembly D after leasing has been completed by the conventional leasing method.

In the auxiliary moving body 68 FIG. 13, a shaft portion 326, fitting into the spoke hole 14, and a touching plate 325 are mounted on an output shaft of a first air cylinder 306. The first air cylinder 306 of FIG. 43 is mounted in the advance-paired state on a first rail such as 346 of FIG. parallel to the rim R and biased toward the initial position by means of a first spring 356. In the initial position of the first air cylinder 306, the shaft portion 326 is positioned to be deviated in the moving direction of the rim R while in the spoke hole 14.

Accordingly, when the rim R is moved through one stroke with the first air cylinder 306 set to the output state and the shaft portion 326 placed in pressure contact with the rim R by predetermined pressure, the shaft portion 326 fits in and engages with the spoke hole 14 at a suitable position, and auxiliary moving body 68 is moved to the final position together with the first air cylinder 306. At that time, the mounting position of the touching plate 325 is preset in position in connection with the end tool 69 of the inserting device 4 which will be described later, which touching plate functions as a stopper for locating the inserting position.

Next, the inserting device 4 is mounted in the advance-paired state on second rails 386 provided parallel to the rim R, and the end tool 69 is positioned opposite to the spoke hole 14. A second air cylinder 466 provides movement of the inserting device 4 toward the auxiliary moving body 68, and the output shaft thereof is connected to the inserting device 4. Second springs 416 urge means 426 away from auxiliary moving body 68.

A fastening device is juxtaposed to an inserting device, which employs a combination of a driver device 9, a tool 92, a stopper 91 and biasing springs 916. After the nipple N has been inserted by the inserting device 4 into the rim, the nipple N is finally fastened by the driver device 9. to the spoke.

In the skeleton view of FIG. 44, in the inserting device 4, the shaft portion 326 of the auxiliary moving body 68 is positioned opposite to the end tool 69 with respect to the rim R, and the touching plate 336 is positioned on the same side as the end tool 69. Accordingly, at the time the shaft portion 326 is fitted in and engaged with the spoke hole 14 and positioned at the final position, the second air cylinder 466 is actuated so that the inserting device 4 is moved toward the touching plate 336 against the second springs 476. At the time the end tool 69 comes into abutment with the touching plate 336, the spoke hole 14 is opposite to the end tool 69. At that time, a brake device 506 (FIG. 46) as a locking means 506 interposed between the inserting device 4 and the second rail 456 is actuated whereby the aforesaid opposed state between the spoke hole 14 and the end tool 69 is maintained, in which state the inserting device 4 is actuated to insert the nipple N into the spoke hole 14.

The above-described brake device 506 is constructed as shown in FIG. 46. In the embodiment shown in FIG. 46, a pair of brake pads 516, 516' opposedly provided with the second rail 456 sandwiched therebetween are actuated to be clamped and opened by the third air cylinder 526. The operating timing of the third air cylinder 526 is set so as to obtain the above-described operation.

The specific example of the nipple inserting device which has been described in the skeleton type will be explained in connection with FIGS. 47 through 49 and FIGS. 27 through 29 in connection therewith. First, the assembly K composed of a combination of spokes S and a hub H is held on the securing frame 6, the inserting device 4 provided on one side of the outer periphery of the securig frame 6 and similar to that described in connection with the skeleton view is used as a sub-threadedly engaging device 4b, wheras a main-threadedly engaging device 4a provided with a driving arm 8 for intermittently moving the rim R is disposed on the side opposite to the subthreadedly engaging device 4b.

On the side of the sub-threadedly engaging device 4b, in the arrangement described in connection with the skeleton view, the inserting device 4 adapted to effect linear motion and the auxiliary moving body 68 are made to effect circular motion along the rim R, and the subthreadedly engaging device 4b and the auxiliary moving body 68 are turning-paired relative to the main shaft 60 about which is the rotation center of the securing frame 6.

Therefore, the sub-threadedly engaging device 4b is secured to the upper surface of the first arm 61 freely turning-paired to the main shaft 60, and the auxiliary moving body 68 also comprises an arm likewise freely turning-paired to the main shaft 60.

The rim R is rotatably supported independently of the securing frame 6, and the end tool 69 of the subthreadedly engaging device 4b and the shaft portion 326 of the auxiliary moving body 68 are provided at the same level as that of the spoke hole 14 of the rim R in the supported state. In connection with the plan view (FIG. 48), the spoke hole 14 and the end tool 69 and the shaft portion 326 are arranged so as to form a connection similar to that as described in connection with the skeleton view.

In the auxiliary moving body 68 on the side of the sub-threadedly engaging device 4b, the shaft portion 326 is connected to an output shaft of a rotary actuator 366 (FIG. 48) corresponding to the first air cylinder 306. An upright portion 376 of the auxiliary moving body 68 forms an abutment portion corresponding to the aforementioned touching plate 336. The end edge of a mounting plate 496 connects to a mounting bed 486 for mounting the sub-threadedly engaging device 4b on the first arm 61. First arm 61 is in abutment with the end edge of the upright portion 376, and the mounting bed 486 and auxiliary moving body 68 are connected through the second air cylinder 466. (See FIG. 48.)

The brake device 506 is provided on the undersurface of the first arm 61 and corresponds to the circular second rail 456 disposed thereunder, and a pair of brake pads 516 actuated by the third air cylinder 526 oppose the second rail 456 sandwiched therebetween. (See FIG. 47.)

In the above-described sub-threadedly engaging device 4b, the first arm 61 and the device 4b are moved so that during the intermittent rotation of the spoke holes 14, the auxiliary moving body 68 is actuated and thereafter they face the position of the auxiliary moving body 68, whereby the spoke hole 14 of the rim R properly opposes the end tool 69, at which time the brake device 506 is actuated and becomes locked.

At that time, the rotary actuator 366 is returned to its original position and the shaft portion 326 is disengaged from the spoke hole 14 of the rim R to release the output of the second air cylinder 466 whereby the auxiliary moving body 68 is returned to the initial position by the first spring 356 acting on the auxiliary moving body 68 (FIGS. 43 and 44). Thereafter, the nipple N is inserted into the spoke hole 14 from the end tool 69 and screwed onto the threaded portion at the free end of the spoke S opposed to the inner peripheral side with the rim R sandwiched therebetween, by the sub-threadedly engaging device 4b (FIG. 47).

In threadedly engaging the spoke nipple N onto the threaded portion of the spoke S, the free end of the spoke S is positioned in the neighborhood of the inner peripheral surface of the rim R and the threaded portion is opposed to the end tool 69 with the spoke hole 14 sandwiched therebetween. To this end, a combination of the clamping device 7 and the securing frame 6 is employed which will be described later.

In the state where the assembly K is held on the securing frame 6, the spoke extending from the upper portion of the hub H is located by a group of first notches 63 of the locating element 62 provided on the securing frame 6 and faces to one of the spoke holes 14 of the rim R. The spoke extending from the lower portion of the hub H faces to the other of the spoke holes 14, of the rim R located by a group of second notches 64. The free end of each spoke and the spoke hole 14 are laid on the same radial line.

The clamping device 7 comprises a pair of a first and second clamps 71, 72. As shown in FIGS. 27 through 29, the lower first clamp 71 is formed at the upper surface with a recess 73 parallel to the tangent line of the rim R, and U-shaped open portions 74, are oppositely disposed on the side wall thereof. The other upper second clamp 72 comprises an angle-shaped block capable of being inserted into the recess 73. These first and second clamps 71 and 72 are both driven by the fourth air cylinders 75.

In the case of a combination of the clamping device 7 (FIG. 27) and the securing frame 8 (FIG. 24), the relationship between the first and second notches 63, 64 and the spokes S is set to a predetermined attitude in connection with the inside diameter of the rim R as shown in FIG. 47. In the state where the assembly K is set to the securing frame 6, the respective spokes S are crossed and inclined towards each other in the predetermined state, the free ends thereof being positioned inwardly of the rim R. When the clamping device 7 is actuated, the free end of the spoke from the clamping portion is opposed so as to register with the spoke hole 14 of the rim R and the entire spoke is curved as shown in FIGS. 27, 29. In this state, the spoke nipple N is inserted from the end tool 69, and when the spoke nipple N is threadedly fitted by the sub-threadedly engaging device 4b, the rim R and the spoke S are connected.

Next, the main threadedly-engaging device 4a wil be described. This device 4a is locked at a fixed position. The clamping device 7 similar to that in the sub-threadedly engaging device 4b is provided also at a position opposite to the end tool 69 of the main threadedlyengaging device 4a. For positioning the spoke hole 14 of the rim R on a line connecting the clamping device 7 and the end tool 69, a rim feeding device is incorporated.

This rim feeding device comprises a driving arm 8 with an extension swingingly reciprocal within a fixed range by means of a fifth air cylinder 83, a lever 84 provided on the upper end of extension 85, a rotary actuator 82 mounted on the upper end of the extension 85 and rotatable towards and away from the rim R, and a pin 81 provided at the spoke hole 14. The reciprocal range of the pin 81 which swings at the same angle as the driving arm 8 is set as required. The swinging range from the initial position to the final position (the position at which the end tool 69 registers with the spoke hole 14) is set by the main threadedly engaging device 4a to be slightly greater than a spacing between the spoke holes 14, into which the nipple N is threadedly engaged. In the final position, as shown in FIG. 49 upright portion 85 of the driving arm 8 abuts one side of the mounting plate 496 for mounting the fourth air cylinder 75. Accordingly, when the driving arm 8 is swung counterclockwise in FIG. 48 through one stroke by the fifth air cylinder 83, the pin 81 having previously been urged toward the rim R by the rotary actuator 82 in the going path is at an initial stage fitted in and engaged with the spoke hole 14. The rim R then is rotated to the position at which the spoke hole 14 is opposite to the the end tool 69, after which the rotary actuator 82 assumes the reverse output state, and the pin 81 is disengaged from the spoke hole 14. The fifth air cylinder 83 is actuated to return to its original position and the driving arm 8 is also returned to its initial position. By this repetitious operation, the rim R is intermittently moved.

The main shaft 60 is operatively connected to the driving arm 8 trough a one-way clutch 0, and the assembly K is rotated through a fixed angle together with the securing frame 8 according to the reciprocating operation of one stroke of the driving arm 8.

Since the swinging angle of the driving arm 8 is set to be greater than a feel amount of one stroke necessary for the rim R, the assembly K is fed slightly ahead in one feed operation. Thereby, the spoke S with which the spoke nipple N is threadedly engaged is slightly disengaged from the spoke hole 14 of the rim R, and at the same time disengaged from the central portion of the open portions 74, 74. However, when the first and second clamps 71, 72 are fitted, the spoke S is forcibly moved to a proper position.

When the threadedly engaging operation of the nipples N is repeatedly carried out, the prior rotational amount of the assembly K to the rim R increases and finally the spoke S becomes disengaged from the U-shaped open area of the open portion 74. For overcoming this inconvenience, according to the illustrated embodiment, the securing frame 6 and the main shaft 60 are connected by turning a clutch device 65 so that only in the going-path of the moving area of the driving arm 8 the clutch device 65 is in the ON state to transmit a rotational torque from the driving arm 8 to the securing frame 6. Accordingly, when the clamping device 7 is operated and when the main threadedly engaging device 4a is operated, the securing frame 6 is placed in free condition. Therefore, when the spoke nipple N has already been threadedly engaged, the assembly K is returned through the prior moving amount in one stroke, and this prior movement is corrected.

When plural sets of spokes S, S are connected with the rim R by the spoke nipples N, the rim R and the assembly K become integrated. Therefore, the rim R and the assembly K are synchronously rotated according to the operation of the driving arm 8, at which time therefore the transmission of torque caused by the clutching device 65 is not necessary. Thus, thereafter, the main shaft 60 and the securing frame 6 may be rendered free.

In the embodiment, the spoke nipple N is threadedly engaged with the spoke S extending from the upper portion of the hub H by the main threadedly engaging device 4a in a portion where the latter is disposed, and the rim R is intermittently driven at a fixed pitch. Accordingly, the auxiliary moving body 68 is operatively connected in the portion of the sub-threadedly engaging device 4b, in which portion the spoke nipple N is threadedly engaged with the spoke S extending from the lower portion of the hub H. Furthermore, in the embodiment shown in FIG. 50, the combination of the second air cylinder 466 and the second spring 476 as shown in skeleton figure is realized by the second spring alone. The initial position of the end tool 69 in the inserting device 4 is positioned on this side of the final position.

In this arrangement, as the auxiliary moving body 68 moves, a part of the inserting device 4 and the auxiliary moving body 68 first abut each other and then are moved to the final position of the auxiliary moving body as they are. Then, the end tool 69 and the spoke hole 14 stop while being opposed to each other. In this case, the second spring (which corresponds to one indicated at 476 in FIG. 50) functions as urging means (which corresponds to one indicated at 426 in FIG. 43) as well as pressing means.

Needless to say, the operating stations perform the above-described operations, and therefore they are arranged to form a connection so that said stations are operated at a predetermined timing.

I claim:

1. A method for assembling a wheel for a bicycle comprising:
   aligning spokes mounted on a hub;
   leasing the aligned spokes to form an assembly;
   transferring the assembly of hub and leased spokes to a device for loosely tightening said leased spokes;
   loosely tightening the spokes of the assembly of the hub and leased spokes; and
   fastening the loosely tightened spokes to complete the tightening of the loosely tightened spokes;
   the aligning step further comprising rotating the hub having two spoke mounting plates to thereby radially align the spokes mounted on each spoke mounting plate at the hub and retaining the spokes in an alignment by retaining means provided concentrically with the hub; said retaining means comprising a pair of retaining bodies opposing each other from the top and bottom of the hub, said retaining bodies being paired rotatably with respect to the hub, each said retaining body being composed of spacing-holding means which fit between adjacent aligned spokes, said spacing-holding means being positioned externally in the neighborhood of a spoke mounting plate of the hub, said spacing holding means projecting toward the spokes when the spokes are in the aligned state, thereby retaining the spoke aligned state in the assembly of the wheel;
   the leasing step further comprising supporting first, second, third and fourth spokes on first, second, third and fourth supporting annuli in an initial position, lifting said first, second, third and fourth annuli, moving tentatively the first, second, third and fourth annuli until they are opposed to the second, first, fourth and third spokes respectively, lowering said first, second, third and fourth spokes onto said second, first, fourth and third annuli respectively, and moving relatively said first, second, third and fourth annuli to the initial position whereby the first and second spokes are crossed and the third and fourth spokes are crossed.

2. The method of assembling a wheel for a bicycle as set forth in claim 1, wherein the transferring step further comprises mounting said assembly of hub and leased spokes on a vertically movable travelling device assembly-retaining means and transferring said assembly of hub and leased spokes, said assembly means comprising an elevating shaft vertically movable by elevating means and having a lower end fitting over the shaft of the hub, a retaining frame advance-paired with respect to said elevating shaft, two kinds of multiple tongues projecting from a peripheral edge of said retaining frame so as to oppose the spokes and each being provided with a downwardly extending open portion within which a spoke fits, a hook provided on one tongue so as to close the open portion, and hook actuating means adapted to open and close said hook at a predetermined time, said tongue being placed in correspondence to the first spoke positioned under the hub, the other tongue being placed in correspondence to the second spoke positioned above the hub so that after or simultaneously with downward movement of the elevating shaft, the retaining frame is moved downwardly, and after the downward movement of the retaining frame has been completed, the hook causes the open portion of the tongue to be closed, thereby retaining the assembly of hub and leased spokes and permitting said assembly to be transferred.

3. The method for assembling a wheel for a bicycle as set forth in claim 1, wherein the temporarily tightening step further comprises curving a spoke, thereafter mounting the spoke to a spoke hold of a rim, clamping a threaded portion of the free end of the spoke in the neighborhood internally of the spoke hole of the rim, and threadedly engaging a nipple from the outside of the rim to the spoke, thereby temporarily tightening a spoke for a wheel for a bicycle and repeating the cycle for each spoke.

4. The method for assembling a wheel for a bicycle as set forth in claim 1, wherein the fastening step further comprises intermittently moving in one direction the rim of a temporarily tightened wheel having a multiple of nipples disposed in a temporarily tightened state at a predetermined pitch, providing driver devices therein and movable forward and backward at right angles to the movement of the rim, moving stoppers mounted on said driver devices in the direction of said rim to locate spoke holes containing nipples having heads as the rim moves by abutting the stoppers with the heads of the nipples and further fastening the nipples by means of said driver devices thereby completing the fastening of the temporarily tightened nipples.

5. The method for assembling a wheel for a bicycle as set forth in claim 4, wherein the method includes positioning a driver device provided with an oscillatory pawl opposite to a stopper, said pawl being spaced from the rim a greater distance than the projection of the nipple from said rim, moving the pawl to a distance from the rim less than the projection of the nipple from the rim and clamping the nipple between the stopper and the pawl whereby the driver device can complete the fastening of the temporarily tightened nipples.

6. The method for assembling a wheel for a bicycle as set forth in claim 1, including continuously inserting nipples into the spoke holes arranged at a fixed pitch in the rim, intermittently moving the rim between insertions of nipples, providing an auxiliary moving body in the neighborhood of the rim which auxiliary moving body engages the spoke hole in the rim within the moving area of one stroke of the rim from an initial position to a final position, after which the auxiliary moving body separates from the rim and returns to said initial moving position, moving an inserting device parallel to said rim from a first position to a position deviated from the final position of the auxiliary moving body whereby the inserting device abuts the auxiliary moving body before removal from the spoke hole biasing said inserting device to return to said first position, and locking the inserting device and the auxiliary moving body in an abutting relationship so that after removal of the auxiliary moving body from the spoke hole the inserting device is in alignment to insert a nipple into the spole hole.

* * * * *